(12) United States Patent
Jung et al.

(10) Patent No.: US 12,373,700 B2
(45) Date of Patent: Jul. 29, 2025

(54) ELECTRONIC DEVICE AND CONTROLLING METHOD OF ELECTRONIC DEVICE FOR APPLYING A LOGICAL CONSTRAINT TO A NEURAL NETWORK MODEL

(71) Applicant: Samsung Electronics Co., Ltd., Suwon-si (KR)

(72) Inventors: Hyunjoo Jung, Suwon-si (KR); Chiyoun Park, Suwon-si (KR); Ilgu Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1046 days.

(21) Appl. No.: 17/158,561

(22) Filed: Jan. 26, 2021

(65) Prior Publication Data
US 2021/0232857 A1    Jul. 29, 2021

Related U.S. Application Data

(60) Provisional application No. 62/966,679, filed on Jan. 28, 2020.

(30) Foreign Application Priority Data

Sep. 29, 2020  (KR) .................. 10-2020-0126820

(51) Int. Cl.
*G06N 3/084* (2023.01)
*G06F 18/21* (2023.01)
(Continued)

(52) U.S. Cl.
CPC ........... *G06N 3/084* (2013.01); *G06F 18/214* (2023.01); *G06F 18/2178* (2023.01);
(Continued)

(58) Field of Classification Search
CPC ............ G06N 3/084; G06N 3/04; G06N 3/08; G06N 3/045; G06N 3/044; G06N 3/047;
(Continued)

(56) References Cited

U.S. PATENT DOCUMENTS

| 5,253,327 A | 10/1993 | Yoshihara |
| 8,086,052 B2 | 12/2011 | Toth et al. |

(Continued)

FOREIGN PATENT DOCUMENTS

| CN | 101414351 A | 4/2009 |
| CN | 106548234 A | 3/2017 |

(Continued)

OTHER PUBLICATIONS

Valeri Mladenov et al., "Solving Sudoku puzzles by using Hopfield neural networks", ICACM'11, pp. 174-179, May 31, 2011.
(Continued)

*Primary Examiner* — Jennifer N Welch
*Assistant Examiner* — Amy P Hoang
(74) *Attorney, Agent, or Firm* — Jefferson IP Law, LLP

(57) ABSTRACT

A controlling method of an electronic device are provided. The controlling method includes obtaining, a first feature value corresponding to the input data, mapping information included in the first feature value to a symbolic value corresponding to each of a logically certain information and uncertain information, tweaking a gradient corresponding to the uncertain information, obtaining a second feature value in which the first feature value and the symbolic value are merged, obtaining temporary answer information including the certain information and the uncertain information, obtaining score information related to a level the temporary answer information matches a pre-defined logic rule, training the neural network model based on the tweaked gradient when the score information is less than a pre-set threshold
(Continued)

value, and obtaining an output data on the input data based on the obtained second feature value when the score information is greater than or equal to the pre-set threshold value.

15 Claims, 9 Drawing Sheets

(51) Int. Cl.
    *G06F 18/214*     (2023.01)
    *G06F 18/24*     (2023.01)
    *G06F 18/40*     (2023.01)
    *G06N 3/04*     (2023.01)
    *G06N 3/08*     (2023.01)

(52) U.S. Cl.
    CPC ........ *G06F 18/24765* (2023.01); *G06F 18/41* (2023.01); *G06N 3/04* (2013.01); *G06N 3/08* (2013.01)

(58) Field of Classification Search
    CPC ........ G06N 3/042; G06N 5/013; G06N 5/046; G06F 18/214; G06F 18/2178; G06F 18/24765; G06F 18/41; G06F 18/217; G06F 18/253
    See application file for complete search history.

(56) References Cited

U.S. PATENT DOCUMENTS

| | | |
|---|---|---|
| 8,463,722 B2 | 6/2013 | Knoblauch |
| 10,380,484 B2 | 8/2019 | Goel et al. |
| 10,819,844 B2 | 10/2020 | Kim et al. |
| 11,055,320 B2 | 7/2021 | Chandna et al. |
| 11,132,621 B2 | 9/2021 | Botea et al. |
| 2003/0174872 A1 | 9/2003 | Chalana et al. |
| 2003/0174881 A1* | 9/2003 | Simard ............... G06V 10/454 382/159 |
| 2015/0332171 A1* | 11/2015 | Nakagawa ........... G06N 5/025 706/14 |
| 2016/0358070 A1 | 12/2016 | Brothers et al. |
| 2017/0169326 A1 | 6/2017 | Diamos et al. |
| 2017/0293757 A1 | 10/2017 | Rosenman et al. |
| 2017/0330076 A1 | 11/2017 | Valpola |
| 2018/0046915 A1* | 2/2018 | Sun .................. G06N 3/082 |
| 2018/0107925 A1 | 4/2018 | Choi et al. |
| 2018/0114110 A1 | 4/2018 | Han et al. |
| 2018/0114114 A1 | 4/2018 | Molchanov et al. |
| 2018/0189950 A1* | 7/2018 | Norouzi ............... G06T 7/11 |
| 2018/0247193 A1 | 8/2018 | Holtham |
| 2018/0336468 A1* | 11/2018 | Kadav .................. G06V 10/454 |
| 2018/0357538 A1 | 12/2018 | Hwang et al. |
| 2018/0373975 A1 | 12/2018 | Yu et al. |
| 2019/0080241 A1 | 3/2019 | Guo et al. |
| 2019/0114391 A1 | 4/2019 | Jaganathan et al. |
| 2019/0114462 A1 | 4/2019 | Jang et al. |
| 2019/0197406 A1 | 6/2019 | Darvish Rouhani et al. |
| 2019/0279089 A1 | 9/2019 | Wang |
| 2019/0325267 A1 | 10/2019 | Chen |
| 2020/0034661 A1 | 1/2020 | Kim et al. |
| 2020/0042796 A1 | 2/2020 | Kim et al. |
| 2020/0059551 A1 | 2/2020 | Kim et al. |
| 2020/0302303 A1 | 9/2020 | Chen et al. |
| 2021/0117651 A1 | 4/2021 | Kotake |
| 2021/0201128 A1* | 7/2021 | Xu ..................... G06F 16/254 |
| 2022/0080972 A1 | 3/2022 | Chen et al. |

FOREIGN PATENT DOCUMENTS

| | | |
|---|---|---|
| CN | 109870162 A | 6/2019 |
| CN | 110070178 A | 7/2019 |
| CN | 110532846 A | 12/2019 |
| JP | 2006-137277 A | 6/2006 |
| JP | 4258268 B2 | 4/2009 |
| JP | 6760318 B2 | 9/2020 |
| KR | 10-2017-0092595 A | 8/2017 |
| KR | 10-2018-0045635 A | 5/2018 |
| KR | 10-2018-0075368 A | 7/2018 |
| KR | 10-2018-0134740 A | 12/2018 |
| KR | 10-2019-0094133 A | 8/2019 |
| KR | 10-2019-0103084 A | 9/2019 |
| KR | 10-2019-0106861 A | 9/2019 |
| KR | 10-2124171 B1 | 6/2020 |
| KR | 10-2163498 B1 | 10/2020 |
| WO | 2016/083657 A1 | 6/2016 |

OTHER PUBLICATIONS

Tai-Wen Yue et al., "Sudoku Solver by Q'tron Neural Networks", ICIC 2006, pp. 943-952, Dec. 31, 2006.
International Search Report dated Mar. 9, 2020, issued in International Application No. PCT/KR2019/016235.
Written Opinion dated Mar. 9, 2020, issued in International Application No. PCT/KR2019/016235.
Shalini Ghosh et al., "Trusted Neural Networks for Safety-Constrained Autonomous Control", arXiv: 1805.07075v1, May 18, 2018.
International Search Report dated May 13, 2021, issued in International Application No. PCT/KR2021/001041.
Written Opinion dated May 13, 2021, issued in International Application No. PCT/KR2021/001041.
Extended European Search Report dated Oct. 10, 2022, issued in European Patent Application No. 21747753.8-1203.
Indian Examination Report dated Dec. 5, 2022, issued in the Indian Patent Application No. 202217029971.
European Examination Report dated Jun. 16, 2023, issued in European Application No. 19910158.5.
Weizhe Hua et al"Channel Gating Neural Networks", arxiv.org, Cornell University Library, 201 Olin Library Cornell University Ithaca, NY 14853, May 29, 2018 (May 29, 2018), XP080884351.
Extended European Search Report dated Nov. 19, 2021, issued in European Patent Application No. 19910158.5-1203.
Xitong Gao et al., Dynamic channel pruning: Feature boosting and suppression, arXiv preprint arXiv:1810.05331, (Year: 2018).
Sangchul Hahn et al., Gradient acceleration in activation functions, (Year: 2018).
Wei Wen et al., Learning structured sparsity in deep neural networks, Advances in neural information processing systems 29, (Year: 2016).
Rupesh Kumar Srivastava et al., Compete to compute, Advances in neural information processing systems 26, (Year: 2013).
Sergey Ioffe et al., Batch normalization: Accelerating deep network training by reducing internal covariate shift, International conference on machine learning. pmlr, (Year: 2015).
U.S. Non-final Office Action dated Apr. 11, 2024, issued in U.S. Appl. No. 17/286,982.
Indian Hearing Notice dated May 17, 2024, issued in Indian Patent Application No. 202217029971.
European Oral Proceedings dated May 29, 2024, issued in European Patent Application No. 19910158.5.
U.S. Office Action dated Aug. 22, 2024; U.S. Appl. No. 17/286,982.
Chinese Office Action with English translation dated Oct. 30, 2024; Chinese Appln. No. 202180011639.8.
U.S. Notice of Allowance dated Nov. 21, 2024; U.S. Appl. No. 17/286,982.
European Brief Communication dated Nov. 4, 2024; European Appln. No. 19 910 158.5-1203.
Chinese Office Action with English translation dated Mar. 31, 2025; Chinese Appln. No. 202180011639.8.
European Decision to refuse dated Feb. 13, 2025; European Appln. No. 19 910 158.5-1203.
Korean Office Action with English translation dated Jun. 14, 2025; Korean Appln. No. 10-2019-0118918.

\* cited by examiner

ELECTRONIC DEVICE AND CONTROLLING METHOD OF ELECTRONIC DEVICE FOR APPLYING A LOGICAL CONSTRAINT TO A NEURAL NETWORK MODEL

CROSS-REFERENCE TO RELATED APPLICATION(S)

This application is based on and claims priority under 35 U.S.C. § 119(e) of a U.S. Provisional application Ser. No. 62/966,679, filed on Jan. 28, 2020, in the U.S. Patent and Trademark Office, and under 35 U.S.C. § 119(a) of a Korean patent application number 10-2020-0126820, filed on Sep. 29, 2020, in the Korean Intellectual Property Office, the disclosure of each of which is incorporated by reference herein in its entirety.

BACKGROUND

1. Field

The disclosure relates to an electronic device and a controlling method of an electronic device. More particularly, the disclosure relates to an electronic device for applying a logical constraint to a neural network model and a controlling method of an electronic device.

2. Description of Related Art

Recently, technologies on neural network models such as deep neural network (DNN) are being continuously developed with the application of the technology to a variety of fields. However, when using a neural network model, although a high likelihood result may be derived statistically/probabilistically by training the neural network model on the basis of the learning data, there is the limitation of solving problems which require a logical inference.

In addition, with respect to the neural network models to date, safety issues are being raised that if training of the neural network model occurs based on a biased or small amount of learning data, it may lead to a result which is unethical or surpasses social common sense/norms.

In addition to the above, in order to exhibit a performance satisfactory to the neural network model, a sufficient amount of leaning data and computing resources, and a training process of a long period may be required, but problems such as sufficient learning data, training time, and computing resource not always being guaranteed in an actual environment are also being raised.

Accordingly, there is a need for technology to expand the usability and training efficiency of the neural network model by applying a logical constraint to the neural network model so that the neural network model may output not only a high likelihood result statistically but also a reasonable result logically.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device which expands usability and learning efficiency of a neural network model by minimizing changes to a structure of an existing neural network model while applying a logic rule, solves a safety issue on a neural network model by providing a logically reasonable result with respect to exceptional circumstances which cannot be solved by a statistical determination based on the learning data alone, and minimizes unnecessary processing in the learning process of the neural network model by differentiating statistical information and logically certain information and a controlling method of an electronic device.

Additional aspects will be set forth in part in the description which follows and, in part, will be apparent from the description, or may be learned by practice of the presented embodiments.

In accordance with an aspect of the disclosure, an electronic device configured to apply a logical constraint to a neural network model is provided. The electronic device includes a memory configured to store a neural network model, a symbolic value mapping module, a merge module, a temporary answer acquisition module, a rule check module, and a training determination module, a processor configured to control the electronic device by executing at least one instruction stored in the memory. The processor is configured to obtain, based on input data being input to the neural network model, a first feature value corresponding to the input data through a feature extraction module included in the neural network model, input the first feature value to the symbolic value mapping module, map information included in the first feature value to a symbolic value corresponding to each of a logically certain information and uncertain information, tweak a gradient corresponding to the uncertain information through the symbolic value mapping module for an update on the uncertain information to be possible, obtain a second feature value in which the first feature value and the symbolic value are merged by inputting the first feature value and the symbolic value to the merge module, obtain temporary answer information including the certain information and the uncertain information by inputting the first feature value and the symbolic value to the temporary answer acquisition module, obtain a score information related to a level the temporary answer information matches a pre-defined logic rule by inputting the temporary answer information to the rule check module, train, through the training determination module, the neural network model based on the tweaked gradient based on the score information being less than a pre-set threshold value, and obtain an output data on the input data by inputting the obtained second feature value to a classification module included in the neural network model based on the score information being greater than or equal to the pre-set threshold value.

In accordance with another aspect of the disclosure, a controlling method of an electronic device configured to apply a logical constraint to a neural network model is provided. The controlling method includes obtaining, based on input data being input to the neural network model, a first feature value corresponding to the input data through a feature extraction module included in the neural network model, mapping, by inputting the first feature value to a symbolic value mapping module included in the electronic device, information included in the first feature value to a symbolic value corresponding to each of a logically certain information and uncertain information, tweaking a gradient corresponding to the uncertain information through the symbolic value mapping module for an update on the uncertain information to be possible, obtaining a second feature value in which the first feature value and the symbolic value are merged by inputting the first feature value and the symbolic value to a merge module included in the electronic device, obtaining temporary answer information including the certain information and the uncertain information by inputting the first feature value and the symbolic value to a temporary answer acquisition module included in the electronic device, obtaining a score information related to a level the temporary answer information matches a pre-defined logic rule by inputting the temporary answer information to a rule check module included in the electronic device, and obtaining, through a training determination module included in the electronic device, an output data on the input data by training the neural network model based on the tweaked gradient based on the score information being less than a pre-set threshold value, and inputting the obtained second feature value to a classification module included in the neural network model based on the score information being greater than or equal to the pre-set threshold value.

In accordance with another aspect of the disclosure, a computer readable recording medium including a program which executes a controlling method of an electronic device is provided. The controlling method of the electronic device includes obtaining, based on input data being input to the neural network model, a first feature value corresponding to the input data through a feature extraction module included in the neural network model, mapping, by inputting the first feature value to a symbolic value mapping module included in the electronic device, information included in the first feature value to a symbolic value corresponding to each of a logically certain information and uncertain information, tweaking a gradient corresponding to the uncertain information through the symbolic value mapping module for an update on the uncertain information to be possible, obtaining a second feature value in which the first feature value and the symbolic value are merged by inputting the first feature value and the symbolic value to a merge module included in the electronic device, obtaining temporary answer information including the certain information and the uncertain information by inputting the first feature value and the symbolic value to a temporary answer acquisition module included in the electronic device, obtaining a score information related to a level the temporary answer information matches a pre-defined logic rule by inputting the temporary answer information to a rule check module included in the electronic device, and obtaining, through a training determination module included in the electronic device, an output data on the input data by training the neural network model based on the tweaked gradient based on the score information being less than a pre-set threshold value, and inputting the obtained second feature value to a classification module included in the neural network model based on the score information being greater than or equal to the pre-set threshold value.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
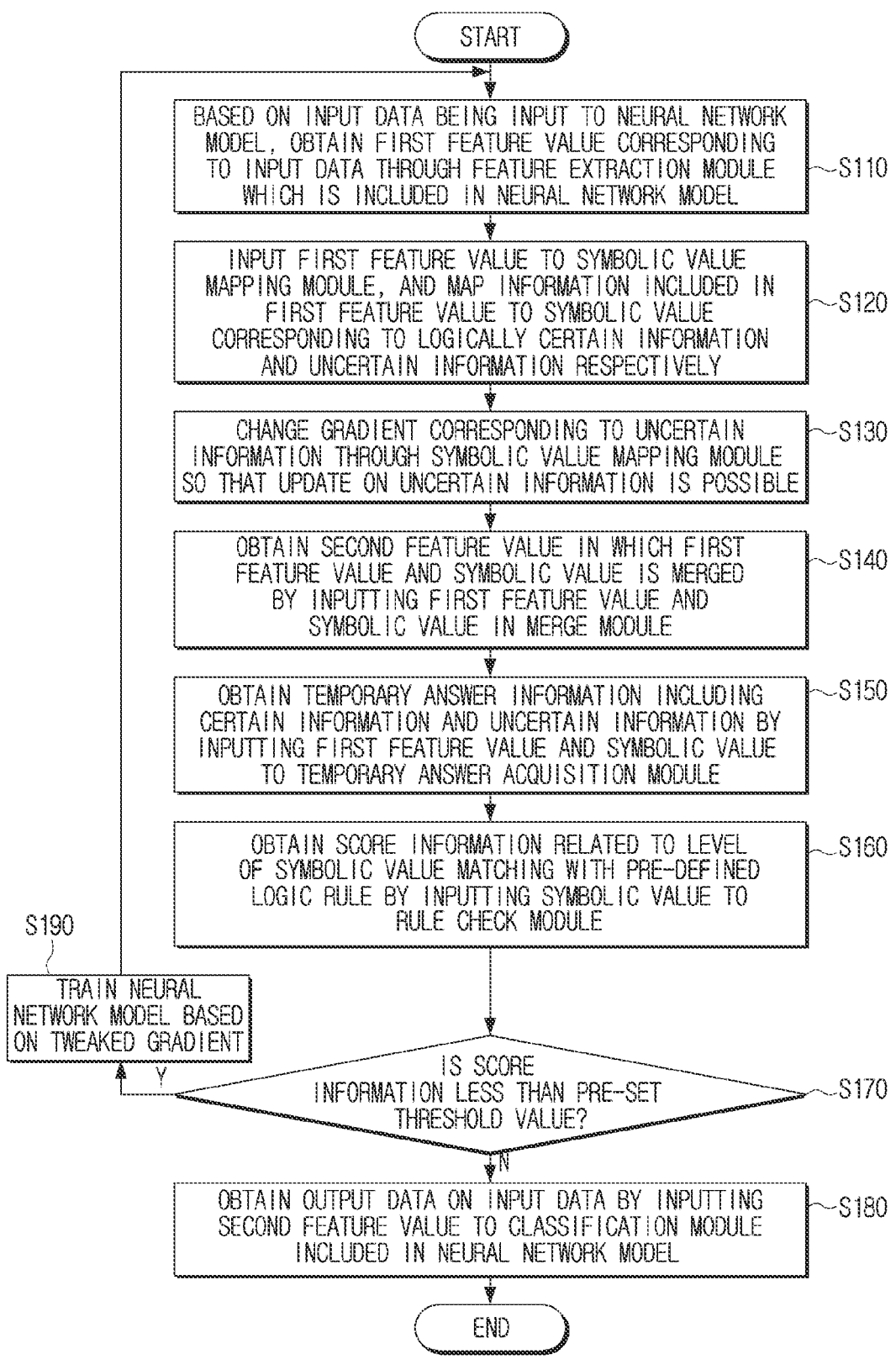
FIG. 1 is a flowchart illustrating each operation of a controlling method of an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Expressions such as, for example, and without limitation, "comprise," "may comprises," "include," "may include," or the like used herein may designate a presence of a corresponding characteristic (e.g., elements such as a number, a function, an operation or a component), and not preclude a presence of additional characteristics.

In the disclosure, expressions such as "A or B," "at least one of A and/or B," or "one or more of A and/or B" may include all possible combinations of the items listed together. For example, "A or B," "at least one of A and B," or "at least one of A or B" may refer to all cases including (1) at least one of A, (2) at least one of B, or (3) both of at least one of A and at least one of B.

Expressions such as "first," "second," "1st," "2nd," or so on may be used on various elements regardless of order and/or importance, and used only to distinguish one element from another, and not limit the corresponding elements.

When a certain element (e.g., first element) is indicated as being "(operatively or communicatively) coupled with/to" or "connected to" another element (e.g., second element), it may be understood as the certain element being directly coupled with/to the other element or as being coupled through still another element (e.g., third element).

On the other hand, when a certain element (e.g., first element) is indicated as "directly coupled with/to" or "connected to" another element (e.g., second element), it may be understood as still another element (e.g., third element) not being present between the certain element and the other element.

The expression "configured to . . . (or set up to)" used in the disclosure may be used interchangeably with, for example, "suitable for . . . ," "having the capacity to . . . ," "designed to . . . ," "adapted to . . . ," "made to . . . ," or "capable of . . . " based on circumstance. The term "configured to . . . (or set up to)" may not necessarily mean "specifically designed to" in terms of hardware.

Rather, in a certain circumstance, the expression "a device configured to . . . " may mean something that the device "may perform . . . " together with another device or components. For example, the phrase "a processor configured to (or set up to) perform A, B, and C" may mean a dedicated processor (e.g., embedded processor) for performing a corresponding operation, or a generic-purpose processor (e.g., a central processing unit (CPU) or an application processor) capable of performing the corresponding operations by executing one or more software programs stored in a memory device.

In the embodiments, a 'module,' or a 'part' may perform at least one function or an operation, and may be implemented as hardware or software, or a combination of hardware and software. In addition, a plurality of 'modules' or a plurality of 'parts' may be integrated in at least one module and realized in at least one processor except for when a 'module' or a 'part' needs to be realized in an individual hardware.

Various elements and areas in the drawings have been schematically illustrated. Accordingly, the technical idea of the disclosure is not limited by the relative size or distance illustrated in the accompanied drawings.

The electronic device according to the various embodiments may include at least one from among a smartphone, a tablet personal computer (PC), a desktop computer, a laptop PC, or a wearable device. The wearable device may include at least one of an accessory type (e.g., a watch, a ring, a bracelet, an anklet, a necklace, a pair of glasses, a contact lens or a head-mounted-device (HMD)), a fabric or a garment-embedded type (e.g., electronic clothing), a body-attached type (e.g., a skin pad or a tattoo), or a bio-implantable circuit.

In some embodiments, the electronic device may include at least one from among, for example, and without limitation, a television, a digital video disc (DVD) player, an audio, a refrigerator, a cleaner, an oven, a microwave, a washing machine, an air purifier, a set top box, a home automation control panel, a security control panel, a media box (e.g., SAMSUNG HOMESYNC™, APPLE TV™, or GOOGLE TV™), a game console (e.g., XBOX™, PLAYSTATION™, etc.), an electronic dictionary, an electronic key, a camcorder, or an electronic frame.

In another embodiment, the electronic device may include at least one from among various medical devices (e.g., various portable medical measurement device (e.g., glucose measuring device, a heart rate measuring device, a blood pressure measuring device, a temperature measuring device, etc.), a magnetic resonance angiography (MRA), a magnetic resonance imaging (MRI), a computed tomography (CT), an imaging apparatus, an ultrasonic device, etc.), a navigation device, a global navigation satellite system (GNSS), an event data recorder (EDR), a flight data recorder (FDR), a vehicle infotainment device, a nautical electronic equipment (e.g., nautical navigation device, gyro compass, etc.), an avionics electronic device, a security device, a vehicle head unit, an industrial or personal robot, a drone, an automated teller machine (ATM) of financial institutions, a point of sales (POS) of shops, or an internet of things device (e.g., light bulbs, various sensors, sprinkler devices, fire alarms, temperature adjusters, street lights, toasters, exercise equipment, hot water tanks, heater, boilers, etc.).

The embodiments will be described in greater detail below with reference to the accompanying drawings to assist those of ordinary skill in the art to easily understand the disclosure.

Figure 2:
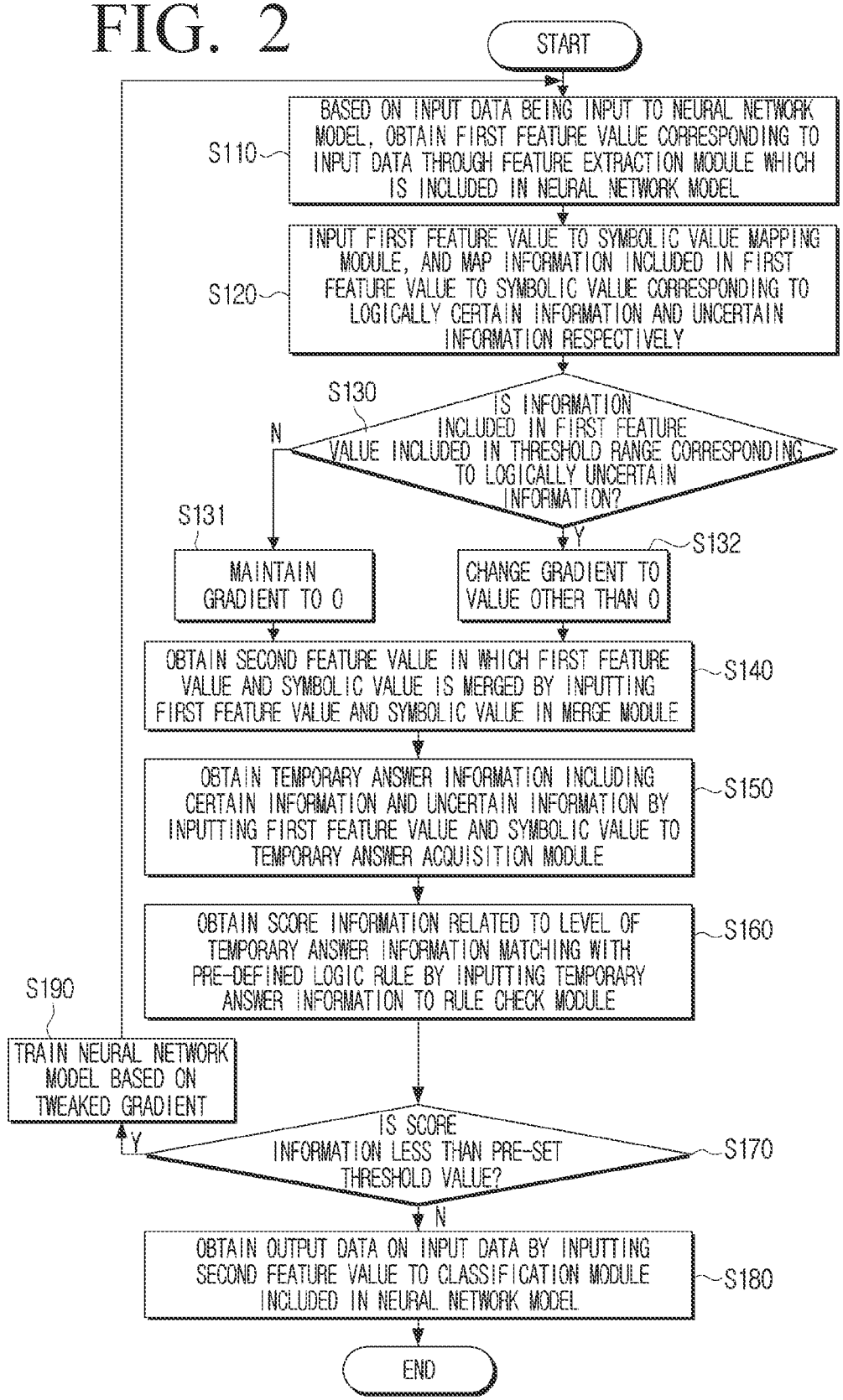
FIG. 2 is a flowchart illustrating in greater detail a controlling method of an electronic device according to an embodiment of the disclosure.

FIG. 1 is a flowchart illustrating each operation of a controlling method of an electronic device according to an embodiment of the disclosure, and FIG. 2 is a flowchart illustrating in greater detail a controlling method of an electronic device according to an embodiment of the disclosure.

Figure 3:
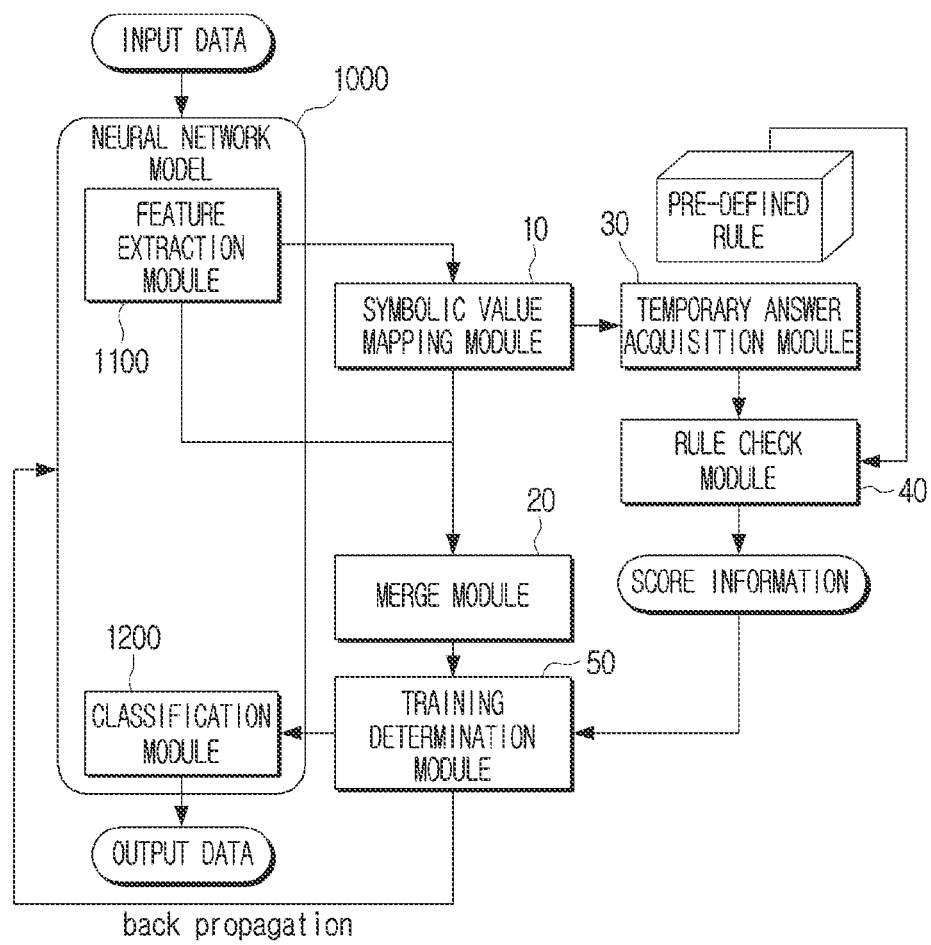
FIG. 3 is a block diagram illustrating an architecture of a software module according to an embodiment of the disclosure.

FIG. 3 is a block diagram illustrating an architecture of a software module according to an embodiment of the disclosure.

The various embodiments of the disclosure will be described below with reference to FIGS. 1 to 3.

Referring to FIGS. 1-3, the 'electronic device' according to the disclosure is to apply a logical constraint to a neural network model, and so long as the device is configured to perform each stage of the controlling method as described below, the device may correspond to the electronic device according to the disclosure regardless of the type thereof. For example, the electronic device may be implemented to various types such as a smartphone, a tablet PC, a notebook, and a digital television (TV), the embodiment is not limited thereto. The electronic device according to the disclosure may be described below designated as a 'electronic device 100.'

A 'neural network model 1000' according to the disclosure may refer to an artificial intelligence model including an artificial neural network, and may be trained by deep learning. For example, the neural network model 1000 may include at least one artificial neural network from among a Deep Neural Network (DNN), a Convolution Neural Network (CNN), a Recurrent Neural Network (RNN), and a Generative Adversarial Networks (GAN). In addition, the neural network model 1000 may be of the same type as, for example, and without limitation, an object recognition model, an automatic speech recognition model, a speech synthesis model, and the like, but the neural network model 1000 according to the disclosure is not limited to the above-described examples. The neural network model 1000 may not only be included in the electronic device 100 and implemented in an on-device form, but also be included in an external device which is coupled to the electronic device 100.

Referring to FIG. 3, the neural network model 1000 may include a feature extraction module 1100 and a classification module 1200. The 'feature extraction module 1100' herein may refer to a module which extracts features useful to the corresponding neural network model 1000 from an input data, and is capable of quantifying the feature to output a feature value. For example, the feature extraction module 1100 may include a convolutional layer which performs convolutional processing for each channel of an input data matrix to obtain a feature map. The feature value output by the feature extraction module 1100 may be represented as a matrix/vector corresponding to a matrix/vector of input data.

The 'classification module 1200' may refer to a module capable of obtaining output data corresponding to input data by identifying a category corresponding to input data from among the plurality of categories (or class) based on a feature value which is output by the feature extraction module 1100. The classification module 1200 may include a softmax layer, which may be configured to output a likelihood value for each of the plurality of categories by normalizing the output value.

In the electronic device 100, the neural network model 1000 as described above may be stored, and as illustrated in FIG. 3, modules such as a symbolic value mapping module 10, a merge module, a temporary answer acquisition module 30, a rule check module 40, and a training determination module 50 may be stored therein.

The specific process of the controlling method being performed through each of the modules as illustrated in FIG. 3 will be described with reference to FIGS. 1 and 2 below. However, it should be noted that an architecture of a software module as illustrated in FIG. 3 is merely one embodiment, and a new configuration may be included in addition to the module as illustrated or some modules may be omitted. In addition, at least two or more modules from among the modules according to the disclosure may be implemented as one module of an integrated type.

Referring to FIGS. 1 and 2, based on input data being input in the neural network model 1000, the electronic device 100 may obtain a first feature value corresponding to the input data through the feature extraction module 1100 included in the neural network model 1000 at operation S110. The feature value output by the feature extraction module 1100 of the neural network model 1000 may be referred to as a 'first feature value.'

The neural network model 1000 may, as described above, obtain the feature value corresponding to the input data through the feature extraction module 1100, and obtain an output data corresponding to the input data by inputting the obtained feature value to the classification module 1200. However, the electronic device 100 may not immediately input the first feature value obtained through the feature extraction module 1100 to the classification module 1200, and may be configured so that the first feature value may be input to the classification module 1200 by passing through the symbolic value mapping module 10 the merge module.

The electronic device 100 may input the obtained first feature value to the symbolic value mapping module 10, and map the information included in the first feature value to the symbolic value corresponding to a logically certain information and uncertain information, respectively at operation S120.

The 'symbolic value mapping module 10' may refer to a module capable of mapping the first feature value obtained through the feature extraction module 1100 of the neural network model 1000 to the symbolic value corresponding thereto. The symbolic value mapping module 10 may be a module for converting the continuous first feature values to discrete symbolic values.

The 'symbolic value (or, logical value)' with respect to a pre-defined logic rule may include a symbolic value corresponding to the information included in the first feature value being a logically certain information and a symbolic value corresponding to being a logically uncertain information. More specifically, the symbolic value corresponding to being a logically certain information may include a symbolic value corresponding to the information included in the first feature value being logically true and a symbolic value corresponding to being logically false.

The symbolic value mapping module 10 may output a symbolic value corresponding to each of a plurality of sections according to which section from among a plurality of pre-set sections the each of the information included in the first feature value are included. For example, the symbolic value may include values of 1, −1 and 0, which are symbolic values corresponding to if it is certain that the information included in the first feature value is logically true, if it is certain that the information is false, and if the truth of the information is uncertain, respectively. The symbolic value mapping module 10 may output 1 which is a symbolic value corresponding to a first section if the information included in the first feature value is a value of the first section corresponding to true, output-1 which is a symbolic value corresponding to a second section if the information included in the first feature value is a value of the second section corresponding to false, and output 0 which is a symbolic value corresponding to a third section if the information included in the first feature value is a value of the third section corresponding to uncertain. If the information included in the first feature value is uncertain information, the corresponding third section may be referred to as a 'threshold range.'

According to embodiments of the disclosure, the symbolic value including values corresponding to true, false, or uncertain respectively have mainly been described, but the embodiment is not limited thereto. That is, in order to solve a problem of there being no logically false case present, the symbolic value may not include a value corresponding to false, and the values corresponding to uncertain may be divided into a plurality of values according to the degree of uncertainty.

The electronic device 100 may tweak the gradient corresponding to the uncertain information through the symbolic value mapping module 10 so that update on the uncertain information may be possible at operation S130. The neural network model 1000 may be trained by performing a backward propagation process based on the gradient corresponding to the input data. However, when the symbolic value mapping module 10 is operated to map the first feature value as the symbolic value corresponding to a constant as described above, the neural network model 1000 may not be trained by using the gradient because the gradient becomes 0 in all sections.

If the information included in the first feature value corresponds to a logically certain information, there may be no need to update the certain information, whereas if the information included in the first feature value corresponds to a logically uncertain information, there may be a need to train the uncertain information in a direction matching a logic rule. Accordingly, as illustrated in FIG. 2, the electronic device 100 according to the disclosure may present a directionality for the training of the neural network model 1000 by tweaking the gradient corresponding to the information only when the information included in the first feature value is a logically uncertain information.

As illustrated in FIG. 2, if the information included in the first feature value is not included in the threshold range corresponding to the logically uncertain information at operation S130-Y, the electronic device 100 may maintain the gradient corresponding to the certain information to 0 at operation S131. On the other hand, if the information included in the first feature value is included in the threshold range corresponding to the logically uncertain information at operation S130-N, the electronic device 100 may tweak the gradient corresponding to the uncertain information to a value other than 0 at operation S132. That is, the electronic device 100 may, by performing the process of S130 to S132 with respect to each of the information included in the first feature value, tweak the gradient corresponding to the uncertain information from among the information included in the first feature value. The process of tweaking the gradient corresponding to the first feature value through the symbolic value mapping module 10 will be described in greater detail below with reference to FIG. 4.

When the symbolic value corresponding to the first feature value is obtained, the electronic device 100 may obtain a second feature value in which the first feature value and the symbolic value is merged by inputting the first feature value and the symbolic value to the merge module at operation S140.

The 'merge module' may refer to a module capable of merging the first feature value obtained through the feature extraction module 1100 of the neural network model 1000 and the symbolic value obtained through the symbolic value mapping module 10, and re-tweaking to a feature value of a form that can be input to the classification module 1200 of the neural network model 1000. The term 'second feature value' may be used to differentiate the feature value output by the merge module from the first feature value output by the feature extraction module 1100 of the neural network model 1000.

'merge' may simply refer to the calculation of adding the first feature value obtained through the feature extraction module 1100 of the neural network model 1000 and the symbolic value obtained through the symbolic value mapping module 10. The merge module may also perform the calculation of multiplying the first feature value prior to adding the first feature value and the symbolic value and at least one pre-determined weight value from among the symbolic values. For example, the merge module may obtain the second feature value by multiplying a large weight value to create a bigger influence of the symbolic value with respect to the second feature value, and adding the first feature value to the symbolic value multiplied with the weight value. In addition to the above, the merge module may additionally perform the process of normalization to a value of between 0 and 1 by using a softmax function after adding the first feature value and the symbolic value.

Based on obtaining the second feature value as described above, the electronic device 100 may be able to obtain an output data of the neural network model 1000 based on the second feature value in which the symbolic value is reflected on the first feature value and not obtain an output data of the neural network model 1000 based on the first feature value. However, whether the output data is to be obtained based on the second feature value or whether the neural network model is to be trained to obtain the output data after obtaining the updated second feature value may be determined according the description below and a process thereof.

When the first feature value and the symbolic value corresponding to the first feature value is obtained, the electronic device 100 may input the first feature value and the symbolic value to the temporary answer acquisition module 30 to obtain a temporary answer information including the certain information and the uncertain information at operation S150.

The 'temporary answer acquisition module 30' may refer to a module capable of identifying the certain information and the uncertain information from among the information included in the first feature value, and outputting the temporary answer information including the certain information and the uncertain information. The temporary answer acquisition module 30 may classify the information included in the first feature value to the logically certain information and uncertain information based on the symbolic value corresponding to the first feature value. The temporary answer acquisition module 30 may then analyze the meaning of the information included in the first feature value, and obtain the temporary answer information including the meaning of the certain information and the meaning of the uncertain information included in the first feature value. The temporary answer acquisition module may, together with the certain information included in the first feature value, obtain the temporary answer information including the information in which the uncertain information included in the first feature value was randomly tweaked to an arbitrary value.

When the temporary answer information is obtained through the temporary answer acquisition module 30, the electronic device 100 may identify whether the meaning of the temporary answer information matches the pre-defined logic rule. When the temporary answer information corresponding to the first feature value is obtained, the electronic device 100 may input the temporary answer information to the rule check module 40 and obtain the score information related to a level the temporary answer information matches the pre-defined logic rule at operation S160.

The 'rule check module 40' may refer to a module capable of outputting score information related to the level the temporary answer information corresponding to the first feature value matches the pre-defined logic rule. The score information may be in a form of a score in which the temporary answer information has a high value the more it matches the pre-defined logic rule, and may have a low value the more the temporary answer information does not match with the pre-defined logic rule. Further, the score information may be in a form of a rule loss having a low value the more the temporary answer information matches the pre-defined logic rule, and having a high value the more the temporary answer information does not match with the pre-defined logic rule.

Specifically, the rule check module 40 may identify at least one logic rule which is applied to the input temporary answer information from among the plurality of pre-defined logic rules, and output score information related to the level matching the at least one logic rule in which the input temporary answer information is identified. The pre-defined logic rule may be updated based on being received from the external device.

Based on the score information being obtained as described above, the electronic device 100 may determine, through the training determination module 50, whether or not to train the neural network model 1000 or obtain the output data on the input data.

The 'training determination module 50' may refer to a module determining whether or not to further train the neural network model 1000 at the corresponding point-in-time or provide the output data to a user. Specifically, the training determination module 50 may determine whether or not to train the neural network model 1000 based on the second feature value received from the merge module and the score information received from the rule check module 40.

Because the received second feature value includes information on the symbolic value, the training determination module 50 may identify whether the first feature value includes uncertain information based on the second feature value, and thus, determine whether or not training of neural network model 1000 is necessary for updating the uncertain information included in the first feature value. Further, because the score information relates to the level the symbolic value corresponding to the first feature value matches the pre-defined logic rule, the training determination module 50 may determine whether or not training of the neural network model 1000 is necessary based on the received score information.

If the score information is less than a pre-set threshold value at operation S170-Y, the electronic device 100 may train the neural network model 1000 based on the tweaked gradient at operation S180. If the information included in the first feature value is not a match with the logic rule for being greater than or equal to the pre-set threshold value, the electronic device 100 may further train the neural network model 1000 by using the tweaked gradient to update the uncertain information included in the first feature value.

The training of the neural network model 1000 based on the score information refers to the first feature value being updated to include the logically certain information rather than the uncertain information included in the first feature value by updating a parameter (weight value) of the neural network model 1000 in a direction in which the score information is greater than or equal to the pre-set threshold value, and thereby having the symbolic value corresponding to the first feature value, the temporary answer information, and the second feature value updated. The specific training process of the neural network model may, like the training process of a neural network model of the related art, be performed by using methods ranging from a gradient descent to a loss function decrease, or the like.

On the other hand, if the score information is a pre-set threshold value or more at operation S170-N, the electronic device 100 may input the obtained second feature value to the classification module 1200 included in the neural network model 1000 and obtain the output data on the input data at operation S190. If the information included in the first feature value matches the logic rule by the pre-set threshold value or more, the electronic device 100 may no longer train the neural network model 1000, and obtain the output data based on the second feature value to provide to the user. The term 'output data' may refer to data which is finally provided to the user, and may be substituted with the term 'true answer information' to differentiate from the temporary answer information.

As described above, when the score information becomes a pre-set threshold value or more as the uncertain information is updated based on training the neural network model 1000 based on the tweaked gradient, the electronic device 100 may obtain the output data by inputting the updated second feature value to the classification module 1200 through the trained neural network model 1000, may provide the obtained output data to the user.

According to an embodiment of the disclosure as described above, the neural network model 1000 may provide a result matching the logic rule with respect to the problem of whether following the logical inference is appropriate. Accordingly, reliability of the neural network model 1000 may be raised, and also the use range of the neural network model 1000 may be expanded.

Because the existing neural network models 1000 solve problems according to the learned pattern based on the learning data, like the problem associated with safety, it has been difficult to solve the problem of having to forcibly apply logical rules regardless of the learning data. In addition, quantities of learning data and long learning hours may be required to train the existing neural network model 1000, and there has been the problem of outputting an illogical result or even an unethical result going against social norms according to the distribution if the distribution of learning data is biased.

However, the neural network model 1000 according to an embodiment of the disclosure may be trained to follow a specific logic rule regardless of the amount of learning data, learning time, and the distribution learning data, and may solve exceptional cases where the problem cannot be solved based on the learning data based on the logic rule. Then, because the neural network model 1000 according to the disclosure may learn differentiating the logically certain information and uncertain information, unnecessary processing may be minimized and efficiency and speed with respect to the process of training the neural network model 1000 may be improved.

The modules for implementing the controlling method according to embodiments of the disclosure may be implemented in the form of a software module embeddable to the existing neural network model 1000 or in the form of an independent neural network model 1000 by minimizing the structural change of the existing neural network model 1000, and accordingly the adding and changing of the logic rule for applying to the neural network model 1000 may also be easily carried out. The modules according to the disclosure may be a pluggable module which is received from an external device or a server and coupled to an existing application or a neural network model in a form such as a plug-in.

The embodiments as described above with reference to FIGS. 1 to 3 may be usefully utilized when applying the pre-defined logic rule to the neural network model 1000 to solve a problem that has an answer (e.g., solving of puzzles such as sudoku puzzle, Einstein's puzzle, and the like).

Figure 4:
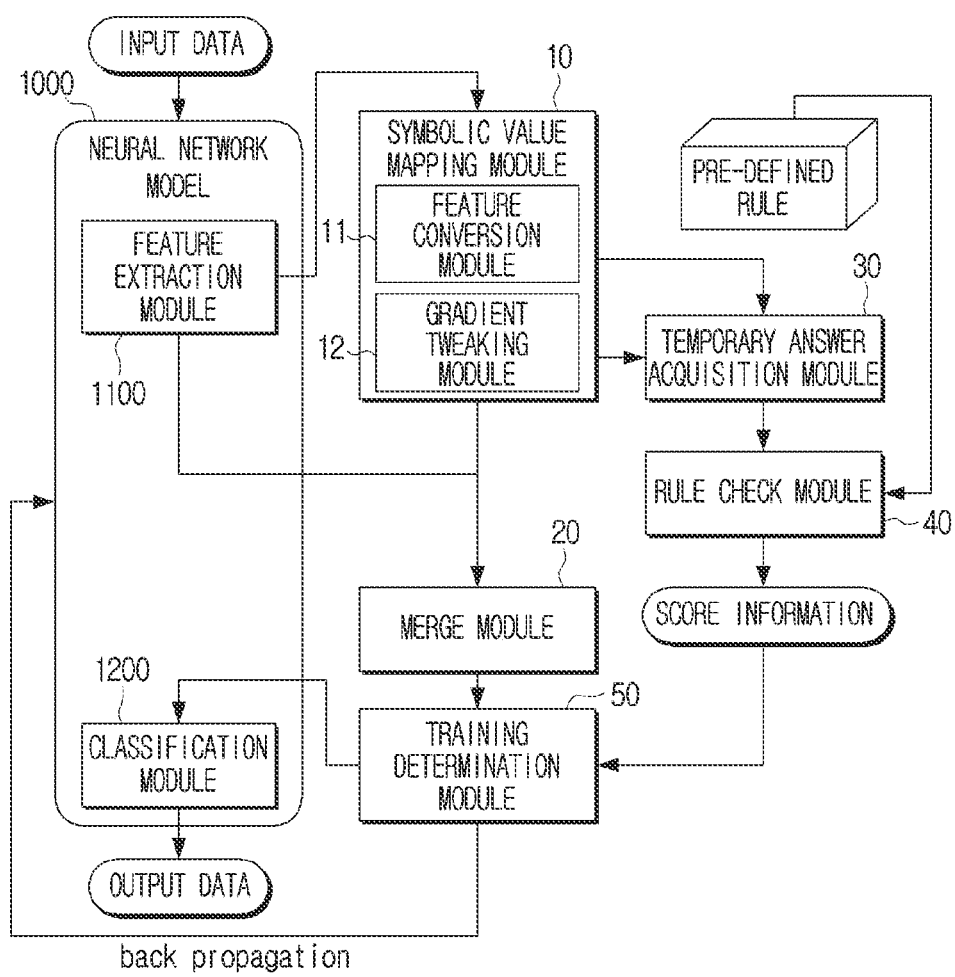
FIG. 4 is a diagram illustrating in greater detail an operation of a symbolic value mapping module according to an embodiment of the disclosure.

FIG. 4 is a diagram illustrating in greater detail an operation of a symbolic value mapping module according to an embodiment of the disclosure.

Referring to FIG. 4, the symbolic value mapping module 10 according to the disclosure may specifically include a feature conversion module 11 and a gradient tweaking module 12.

The 'feature conversion module 11' may refer to a module capable of outputting the symbolic value corresponding to the feature value by tweaking the input feature value. The feature conversion module 11 may, as described above, perform the process (operation S120) of mapping the information included in the first feature value to the symbolic value corresponding to each of the logically certain information and uncertain information.

The 'gradient tweaking module 12' may refer to a module capable of tweaking the gradient corresponding to the logically uncertain information from among the information included in the first feature value. The gradient tweaking module 12 may, as described above, perform the process (operation S130) of tweaking the gradient with respect to only the uncertain information included in the first feature value.

The feature conversion module 11 and the gradient tweaking module 12 included in the symbolic value mapping module 10 are merely for functionally dividing and describing the operations performed according to the symbolic value mapping module 10, and the operations according to each of the feature conversion module 11 and the gradient tweaking module 12 are not performed according to a separate algorithm independent from each other, and may be determined by a function defined in equation 2 as described below. Accordingly, the each of the processes performed by the feature conversion module 11 and the gradient tweaking module 12 being performed in a module referred to as the symbolic value mapping module 10 will be described below.

Specifically, the symbolic value mapping module 10 may, based on a function f(x) (hereinafter referred to as a 'discretizing function') defined as equation 1 below, output 1 which is a symbolic value corresponding to true when the first feature value x is greater than or equal to 0.5, output −1 which is a symbolic value corresponding to false when the first feature value is less than −0.5, and output 0 which is a symbolic value corresponding to uncertainty when the first feature value x is greater than or equal to −0.5 and less than 0.5.

$$f(x) = \begin{cases} -1 & \text{if } x < -0.5 \\ 0 & \text{if } -0.5 \leq x \leq 0.5 \\ 1 & \text{if } x \geq 0.5 \end{cases} \quad \text{Equation 1}$$

That is, the symbolic value mapping module 10 may output 0 as the symbolic value if the information included in the first feature value x is a value within the pre-set threshold range corresponding to uncertain (i.e., if the information included in the first feature value x is uncertain), and output 1 or −1 as the symbolic value if the information included in the first feature value x is a value outside the pre-set threshold range corresponding to uncertain (i.e., if the information included in the first feature value x is certain).

As described above, even if the continuous first feature values are mapped as discrete symbolic values through the symbolic value mapping module 10, if the feature conversion module 11 operates based on a function in which the gradient becomes 0 in all sections as in equation 1, it may be difficult to train the neural network model 1000 by using the gradient. If the information included in the first feature value corresponds to the logically certain information, it would not be necessary to update the certain information, whereas if the information included in the first feature value corresponds to the logically uncertain information, it would be necessary to learn the uncertain information in a direction matching the logic rule.

Accordingly, the symbolic value mapping module 10 may, so long as the information included in the first feature value is the logically uncertain information, tweak the gradient corresponding to the information. The symbolic value mapping module 10 may, by performing the processes of S130 to S132 as described above with respect to each of the information included in the first feature value, tweak the gradient corresponding to the uncertain information from among the information included in the first feature value.

The process of tweaking the gradient corresponding to the first feature value through the symbolic value mapping module 10 will be described in great detail with reference to equations 2 to 7 below.

The symbolic value mapping module 10 according to the disclosure may be operated based on a function as defined in equation 2 below f̂(x) (hereinafter referred to as a 'symbolic value mapping function') and not the discretizing function f(x) as defined in equation 1. Specifically, the symbolic value mapping function f̂(x) may be defined as a function in which the value of multiplying the gradient tweaking function s(x) by the gradient shaping function g(x) is added to the discretizing function f(x) of equation 1.

$$\hat{f}(x) = f(x) + s(x)g(x) \quad \text{Equation 2}$$

The 'gradient shaping function g(x)' may be defined as equation 3 below. The gradient shaping function g(x) may be defined as a function which outputs 1 as a function value with respect to information having a value of greater than or equal to −0.5 and less than 0.5 from among the information included in the first feature value x, and outputs 0 as a function value with respect to information having a value of less than −0.5 or greater than or equal to 0.5 from among the information included in the first feature value x. The gradient shaping function g(x) may output 1 as the function value if the information included in the first feature value x is a value within the pre-set threshold range corresponding to uncertain (i.e., if the information included in the first feature value x is uncertain), and output 0 as the function value if the information included in the first feature value x is a value outside the pre-set threshold range corresponding to uncertain (i.e., if the information included in the first feature value x is certain). The gradient shaping function g(x) may be reflected to the gradient of the symbolic value mapping function. f̂(x) as described below with reference to equation 6 and equation 7.

$$g(x) = \begin{cases} 1 & \text{if } -0.5 \leq x < 0.5 \\ 0 & \text{otherwise} \end{cases} \quad \text{Equation 3}$$

The 'gradient tweaking function s(x)' may be a function of a greatest integer function (floor function) form. However, the gradient tweaking function s(x) is not limited thereto, and may be defined to various functions in addition to an operation function form. If the gradient tweaking function s(x) is defined as the greatest integer function of equation 4, the function value of the gradient tweaking function s(x) may always be less than 1/K based on the definition thereof, and the gradient of the gradient tweaking function s(x) may always be 1 in a differentiable section.

$$s(x) = \frac{Kx - \lfloor Kx \rfloor}{K} \quad \text{Equation 4}$$

As described above, because the function value of the gradient tweaking function s(x) is always less than 1/K, the function value of the gradient tweaking function s(x) approximates 0 when K is sufficiently large, and accordingly, the function value of the symbolic value mapping function f̂(x) may approximate the function value of the discretizing function f(x) as in equation 5 below. If the value of K is sufficiently set to a large value, the symbolic value mapping function f̂(x) may output a function value which approximates f(x) (i.e., the symbolic value).

$$\hat{f}(x) \approx f(x) \quad \text{Equation 5}$$

A derivative f'(x) of the symbolic value mapping function may be as represented in equation 6 below. As described above, the gradient of the gradient tweaking function may always be 1 in a differentiable section, and the function value of the gradient tweaking function s(x) may approximate 0 if K is sufficiently large. Accordingly, as in equation 7 below, the derivative $\hat{f}(x)$ of the symbolic value mapping function may approximate the function value of the gradient shaping function g(x). If the value of K is set to a sufficiently large value, the symbolic value mapping function $\hat{f}(x)$ may have a gradient in which the feature of the gradient shaping function f(x) is reflected.

$$\hat{f}(x)=s'(x)g(x)+s(x)g'(x) \quad \text{Equation 6}$$

$$\hat{f}(x) \approx g(x) \quad \text{Equation 7}$$

However, as described above, the gradient shaping function g(x) may output 1 as a function value if the information included in the first feature value x is a value within the pre-set threshold range corresponding to uncertain, and output 0 as a function value if the information included in the first feature value x is a value outside the pre-set threshold range corresponding to uncertain. Accordingly, the gradient of the symbolic value mapping function $\hat{f}(x)$ may be 0 if the first feature value x is a value outside the pre-set threshold range corresponding to uncertain, and may be 1 if the first feature value x is a value within the pre-set threshold range corresponding to uncertain.

Therefore, when the symbolic value mapping module 10 operates based on the symbolic value mapping function $\hat{f}(x)$ as described above, the symbolic value mapping module 10 may output the discrete symbolic value like when operating based on the discretizing function f(x), while making the training of the neural network model 1000 which uses the gradient possible only when the information included in the first feature value x has a value within the pre-set threshold range corresponding to uncertain.

As described above, it may be necessary for the value of K to be set to large value to the level the function value of the gradient tweaking function s(x) approximates 0. For example, it may be preferable for the value of K to exceed $10^5$. An upper limit of the value of K may be determined within a range in which overflow does not occur and a meaningful processing is possible. For example, the value of K may be less than $10^{305}$. However, the value of K according to the disclosure is not limited to the above-described range.

Figure 5:
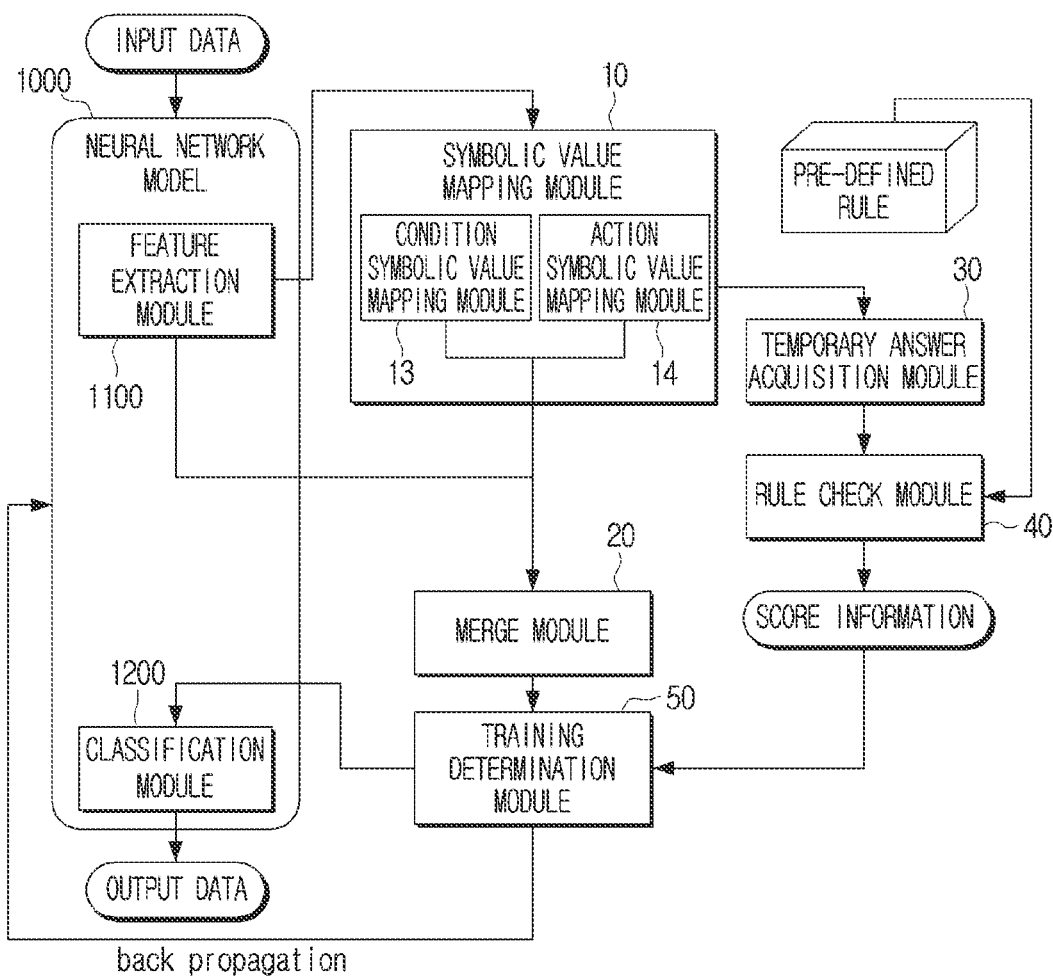
FIG. 5 is a diagram illustrating an embodiment related to the disclosure being applied to solve a problem of selecting one operation under given conditions according to an embodiment of the disclosure.

FIG. 5 is a diagram illustrating an embodiment related to the disclosure being applied to solve a problem of selecting one operation under given conditions according to an embodiment of the disclosure.

As described above with reference to FIGS. 1 to 4, when applying a pre-defined logic rule to the neural network model 1000 to solve a problem with a correct answer, the symbolic value mapping module 10 may operate in a method mapping the at least one symbolic value corresponding to the first feature value, but when being applied to solve the problem of selecting one operation under the given conditions, it is necessary to map a plurality of symbolic values as a symbolic value corresponding to the first feature value.

Referring to FIG. 5, the symbolic value mapping module 10 according to the disclosure may include a condition symbolic value mapping module 13 and an action symbolic value mapping module 14. The 'condition symbolic value mapping module 13' may refer to a module which maps the first feature value to a condition symbolic value, which is the symbolic value corresponding to a pre-defined condition. The 'action symbolic value mapping module 14' may refer to a module which maps the first feature value to an action symbolic value which is the symbolic value corresponding to a pre-defined action.

When the first feature value is input to the symbolic value mapping module 10, the condition symbolic value mapping module 13 may map the information included in the first feature value to a different symbolic value which corresponds to each of the certain information and the uncertain information related to the pre-defined condition. The action symbolic value mapping module 14 may map information included in the first feature value to a different symbolic value corresponding to each of the certain information and the uncertain information related to the pre-defined action.

For example, when the neural network model 1000 according to the disclosure is a neural network model 1000 for determining an operation of an autonomous driving automobile, the electronic device 100 may input the first feature value to the symbolic value mapping module 10 if input data is input to the neural network model 1000 and the first feature value corresponding to the input data is obtained. The electronic device 100 may obtain the symbolic value corresponding to each of the certain information and the uncertain information related to a condition with a high likelihood of a traffic accident occurring from among the information included in the first feature value through the condition symbolic value mapping module 13, and may obtain the symbolic value corresponding to each of the certain information and the uncertain information related to an action which may be taken when there is a high likelihood of a traffic accident occurring through the action symbolic value mapping module 14.

The electronic device 100 may, as described above, tweak the gradient corresponding to the uncertain information through the symbolic value mapping module 10 to make an update on the uncertain information possible, and also obtain the second feature value in which the first feature value and the symbolic value is merged by inputting the first feature value and the symbolic value in the merge module. Because the gradient tweaking process and the second feature obtaining process has been described above with reference to FIGS. 1 to 4, redundant descriptions thereof will be omitted.

When the condition symbolic value and the action symbolic value corresponds to the first feature value being obtained, the electronic device 100 may input the first feature value the condition symbolic value, and the action symbolic value to the temporary answer acquisition module 30 to obtain the temporary answer information including the information on the condition included in the first feature value and the information on the action corresponding thereto. The information on the condition included in the first feature value may include the uncertain information (e.g., information on the traffic situation at the front and rear of the autonomous driving automobile, etc.) and the certain information (e.g., information that the current position of the autonomous driving automobile is in a school zone, information on a speed limit of a current route of the autonomous driving automobile, etc.).

In the above-described example, the temporary answer information obtained through the temporary answer information may include information of a pedestrian at the front being within a pre-set risk distance as a certain information related to the condition with a high likelihood of a traffic accident occurring, and information of a vehicle at the rear being within a pre-set risk distance as an uncertain information related to the condition with a high likelihood of a traffic accident occurring. In addition, the temporary answer information may include information that taking action of 'providing a warning notification' is certain and information that taking action of 'decreasing speed of vehicle' is uncertain under the above-described condition.

When the temporary answer information corresponding to the first feature value is obtained, the electronic device 100 may input the temporary answer information to the rule check module 40 to obtain the score information related to the level the temporary answer information matches the pre-defined logic rule.

In the above-described example, the electronic device 100 may obtain the score information based on whether taking the action of 'providing warning notification' and 'decreasing speed of vehicle' matches the pre-defined logic rule when it is certain that the pedestrian at the front is within the risk distance and it is uncertain that the vehicle at the rear is within the risk distance. The pre-defined logic rule may, for example, be a rule of "perform an unconditional sudden stop when a pedestrian is positioned within a risk distance." In this case, the electronic device 100 may obtain the score information of 0.7 as a score information on taking the action of 'providing warning notification' and 'decreasing speed of vehicle' when it is certain that the pedestrian at the front is within the risk distance and it is uncertain that the vehicle at the rear is within the risk distance.

When the score information on the temporary answer information is obtained, the electronic device 100 may determine whether to train the neural network model 1000 or obtain the output data on the input data through the training determination module 50. If the score information is less than the pre-set threshold value, the electronic device 100 may train the neural network model 1000 based on the tweaked gradient. On the other hand, if the score information is greater than or equal to the pre-set threshold value, the electronic device 100 may input the obtained second feature value to the classification module 1200 included in the neural network model 1000 to obtain the output data on the input data.

In the above-described example, if the threshold value on the score information is pre-set to 0.08, because the score information would be less than the pre-set threshold value, the electronic device 100 may train the neural network model 1000 based on the tweaked gradient. Accordingly, the electronic device 100 may obtain a temporary answer information including the information that taking action of 'a sudden stop of a vehicle' is certain rather than information that taking action of 'decreasing speed of vehicle' is uncertain, when it is certain that the pedestrian at the front is within the risk distance and it is uncertain that the vehicle at the rear is within the risk distance.

According to an embodiment as described above with reference to FIG. 5, the electronic device 100 may, with respect to the problem of selecting an operation under a given condition, provide an output data matching the logic rule by updating the uncertain information to match with the pre-defined logic rule.

As in the above-described example, by applying regulations or general rules with respect to the problem of exceptional circumstances occurring which cannot be solved with only statistical determination based on the learning data, the safety issue which is pointed out with respect to the neural network model 1000 may be resolved. In addition, with respect to the problem of it being difficult to obtain quantities of learning data on a variety of actual circumstance, because it is possible to apply to the neural network model 1000 to match the logic rule, it is possible to operate the neural network model 1000 stably even when there is insufficient learning data or when there is no learning data present.

Figure 6:
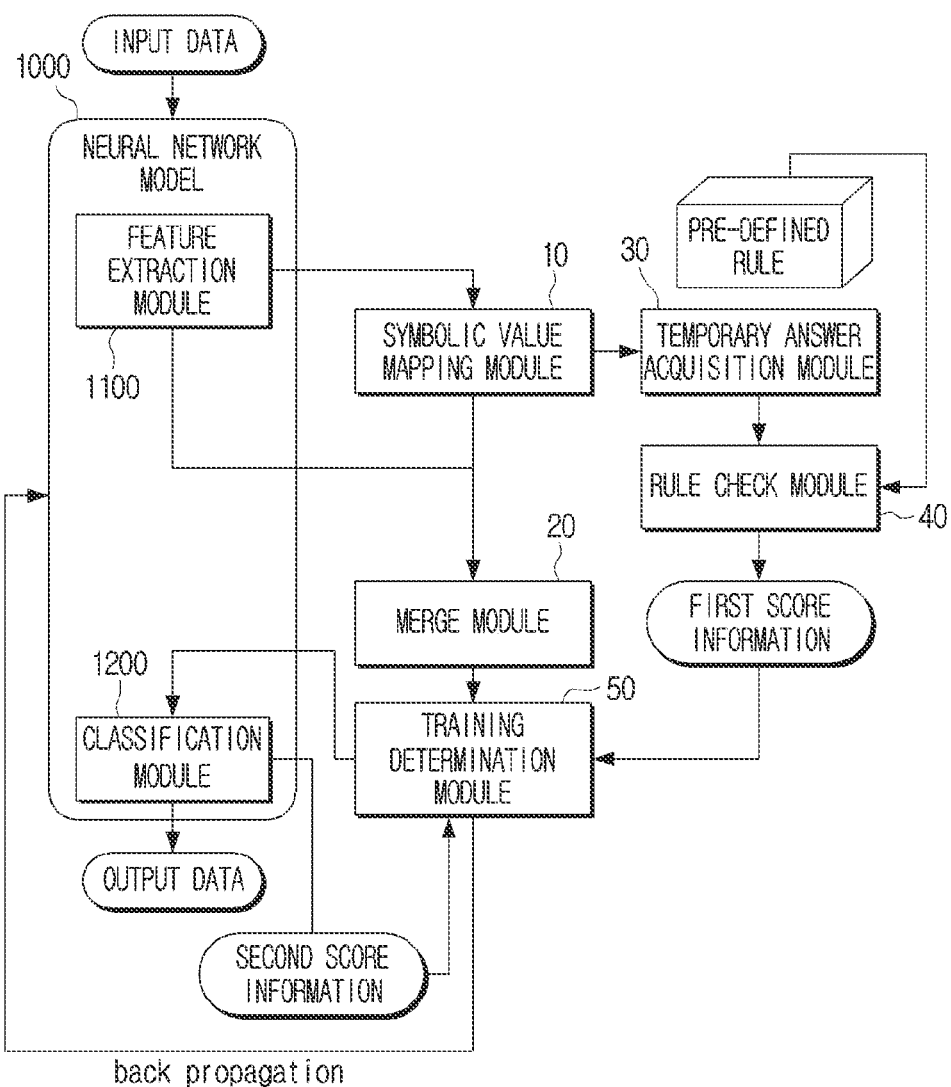
FIG. 6 is a diagram illustrating an embodiment in which a neural network model is trained based on a score information related to a level matching a learning data according to an embodiment of the disclosure.

FIG. 6 is a diagram illustrating an embodiment in which a neural network model is trained based on a score information related to a level matching a learning data according to an embodiment of the disclosure.

As described above, the electronic device 100 may, by training the neural network model 1000 based on the score information related to the level the temporary answer information matches the pre-defined logic rule, provide the output data in which the neural network model 1000 matches the logic rule. Below, the score information related to the level the temporary answer information matches the pre-defined logic rule may be referred to as a 'first score information.'

However, with just the training the neural network model 1000 to match the logic rule, the information that taking action of 'decreasing speed of vehicle' is uncertain in the example described above with reference to FIG. 5 may merely be updated to information that taking action of 'a sudden stop of a vehicle' is certain, and the information that the vehicle at the rear is within the risk distance being uncertain may not be updated to certain information.

With respect to the unreasonable problem of not being able to apply the logic rule or solving according to the logic rule, it may be preferable to provide a result with high likelihood statistically rather than a result based on the logic rule. Accordingly, the electronic device 100 may train the neural network model 1000 based on the score information related to the level the output data matches the learning data of the neural network model 1000 in addition to the score information related to the level matching the pre-defined logic rule. Below, the score information related to the level the output data matches the learning data of the neural network model 1000 may be differentiated from the first score information and referred to as a 'second score information.'

Specifically, referring to FIG. 6, the electronic device 100 may input the temporary answer information to the rule check module 40 to not only obtain the first score information related to the level the temporary answer matches the logic rule, but also obtain the second score information related to the level the output data obtained through the classification module 1200 of the neural network model 1000 matches the learning data of the neural network model 1000. The second score information may include information on a loss function, which is one from among the indicators used in the training of a neural network model 1000 of the related art. Then, the training determination module 50 may not only train the neural network model 1000 to match the pre-defined logic rule based on the first score information, but also train the neural network model 1000 to match with the learning data previously built based on the second score information.

The electronic device 100 may train the neural network model 1000 based on a comprehensive score information in which the first score information and the second score information are combined. The comprehensive score information may be obtained by not only adding the first score information and the second score information, but also by multiplying a pre-determined weight value to at least one of the first score information and the second score information and then adding. For example, with respect to the problem of the logic rule having to be clearly adhered to, a higher weight value may be applied to the first score information rather than the second score information.

According to an embodiment as described above with reference to FIG. 6, the electronic device 100 may, by training the neural network model 1000 to match the learning data with respect to the unreasonable problem of not being able to apply the logic rule or solving the problem according to the logic rule, in addition to applying the logic rule to the neural network model 1000, cause the neural network model 1000 to output a result with a high likelihood statistically.

Figure 7:
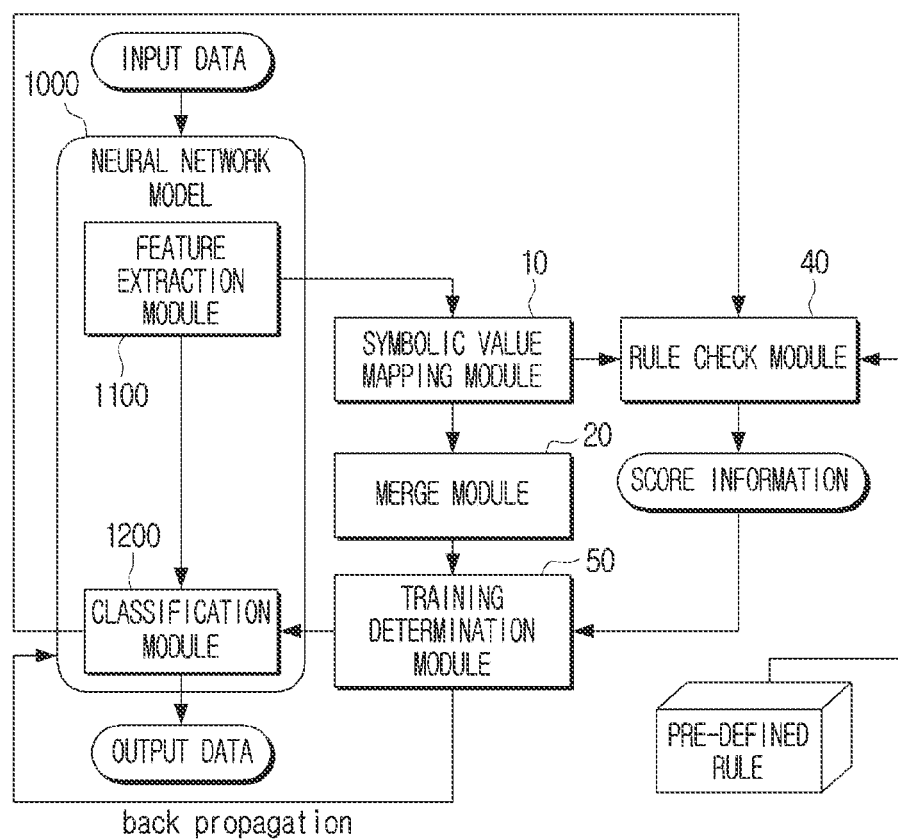
FIG. 7 is a diagram illustrating an embodiment in which a temporary answer information is obtained through a classification module of a neural network model according to an embodiment of the disclosure.

FIG. 7 is a diagram illustrating an embodiment in which a temporary answer information is obtained through a classification module of a neural network model according to an embodiment of the disclosure.

Referring to FIG. 7, the embodiment of obtaining the temporary answer information corresponding to the first feature value through the temporary answer acquisition module 30 included in the electronic device 100 has been described, but according to another embodiment of the disclosure, the classification module 1200 may be implemented so as to not only output the output data as a true answer which is provided to the user, but also output the temporary answer information according to the disclosure. In other words, the function which may be performed through the temporary answer acquisition module 30 may be implemented through the classification module 1200 included in the neural network model 1000.

The first feature value obtained through the feature extraction module 1100 of the neural network model 1000 may be input to the classification module 1200, and the symbolic value obtained through the symbolic value mapping module 10 may by-pass the merge module and the training determination module 50 or may be input to the classification module 1200 in a form which the second feature value is included.

The classification module 1200 may then classify the information included in the first feature value to the logically certain information and uncertain information based on the symbolic value corresponding to the first feature value. In addition, the classification module 1200 may analyze the meaning of the information included in the first feature value to obtain the temporary answer information which includes the meaning of the certain information and the meaning of the uncertain information included in the first feature value. The classification module 1200 may obtain the temporary answer information based on which category from among the pre-defined plurality of categories does the information included in the first feature value correspond.

When the temporary answer information is obtained through the classification module 1200, the electronic device 100 may input the temporary answer information to the rule check module 40 to obtain the score information related to whether the temporary answer matches the pre-defined logic rule, and the training determination module 50 may determine the training of the neural network model 1000 based on the score information. When training of the neural network model 1000 is sufficiently carried out to a level of which the score information is greater than or equal to the pre-set threshold value, the electronic device 100 may input the second feature updated according to the training of the neural network model 1000 to the classification module 1200 and obtain the output data which is provided to the user.

Referring to FIG. 7, because the disclosure may be applied by obtaining the temporary answer information using the structure of an existing neural network model 1000 without a separate module for obtaining the temporary answer information, the plurality of modules according to the disclosure and the existing neural network model 1000 may be more effectively combined.

Figure 8:
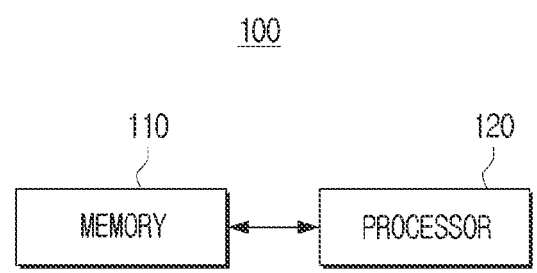
FIG. 8 is a block diagram illustrating in brief a hardware configuration of an electronic device according to an embodiment of the disclosure.
Figure 9:
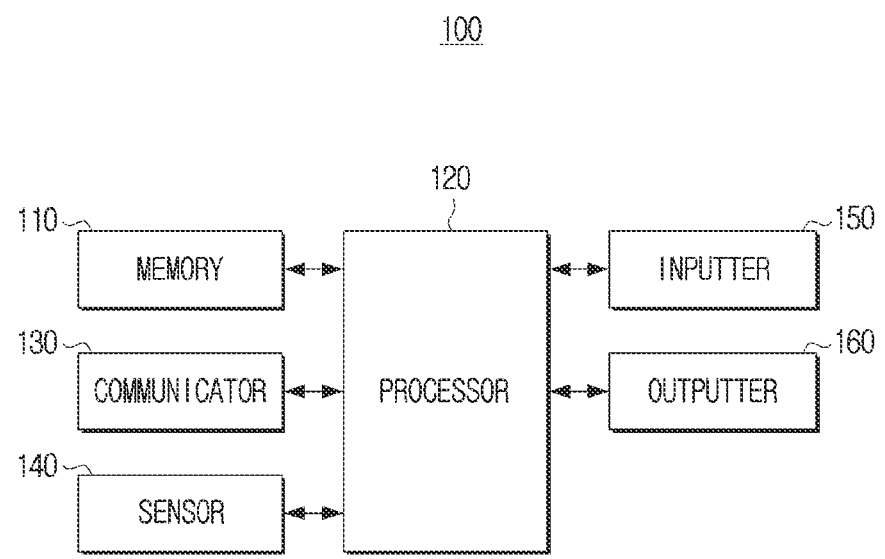
FIG. 9 is a block diagram illustrating in detail a hardware configuration of an electronic device according to an embodiment of the disclosure.

FIG. 8 is a block diagram illustrating in brief a hardware configuration of an electronic device according to an embodiment of the disclosure, and FIG. 9 is a block diagram illustrating in detail a hardware configuration of an electronic device according to an embodiment of the disclosure.

Referring to FIG. 8, the electronic device 100 according to an embodiment of the disclosure may include a memory 110 and a processor 120.

Referring to FIG. 9, the electronic device 100 according to an embodiment of the disclosure may further include a communicator 130, a sensor 140, an inputter 150, and an outputter 160. However, the configurations as illustrated in FIGS. 8 and 9 are merely examples, and a new configuration may be added to or a portion of the configuration may be omitted from the configuration as illustrated in FIGS. 8 and 9.

The memory 110 may be stored with at least one instruction related to the electronic device 100. The memory 110 may be stored with an operating system (O/S) for operating the electronic device 100. In addition, various software programs or applications may be stored in the memory 110 for the electronic device 100 according to the various embodiments to operate. The memory 110 may include a semiconductor memory such as a flash memory or a magnetic storage medium such as a hard disk.

The memory 110 may be stored with various software modules for the electronic device 100 to operate according to the various embodiments of the disclosure, and the processor 120 may execute the various software modules stored in the memory 110 to control the operation of the electronic device 100. The memory 110 may be accessed by the processor 120, and the reading/recording/modifying/updating and the like of data may be performed by the processor 120.

The term memory may be used as a meaning including a memory 110, a read only memory (ROM, not shown) within the processor 120, a random access memory (RAM, not shown), or a memory card (not shown, e.g., micro SD card, memory stick) mounted to the electronic device 100.

The neural network model 1000 according to embodiments the disclosure may be stored in the memory 110, and software modules such as the symbolic value mapping module 10, the merge module, the temporary answer acquisition module 30, the rule check module 40 and the training determination module 50 may also be stored. Further, various data such as the input data, the first feature value, the symbolic value, the gradient, the second feature value, the temporary answer information, the score information, the output data, and the like may be stored in the memory 110.

In addition thereto, a variety of necessary information within the scope of achieving the object of the disclosure may be stored in the memory 110, and the information stored in the memory 110 may be received from the external device or updated based on being input by the user.

The processor 120 may control the overall operation of the electronic device 100. The processor 120 may be coupled with a configuration of the electronic device 100 which includes the memory 110, the communicator 130, the sensor 140, the inputter 150, and the outputter 160, and may control the overall operation of the electronic device 100 by executing at least one instruction stored in the memory 110 as described above.

The processor 120 may be implemented in various methods. For example, the processor 120 may be implemented as at least one from among an application specific integrated circuit (ASIC), an embedded processor, a microprocessor, a hardware control logic, a hardware finite state machine (FSM), or a digital signal processor (DSP). The term processor 120 in the disclosure may be used as a meaning which includes a central processing unit (CPU), a graphics processing unit (GPU), a main processing unit (MPU), and the like.

According to an embodiment of the disclosure, the processor 120 may, based on the input data being input to the neural network model 1000, obtain the first feature value corresponding to the input data through the feature extraction module 1100 included in the neural network model 1000, input the obtained first feature value to the symbolic value mapping module 10, map the information included in the first feature value to the symbolic value corresponding to each of the logically certain information and uncertain information, tweak the gradient corresponding to the uncertain information through the symbolic value mapping module 10 so that update on the uncertain information is possible, input the first feature value and the symbolic value to the merge module to obtain the second feature value in which the first feature value and the symbolic value is merged, input the first feature value and the symbolic value to the temporary answer acquisition module 30 to obtain the temporary answer information which includes the certain information and the uncertain information, input the temporary answer information to the rule check module 40 to obtain the score information related to the level the temporary answer information matches the pre-defined logic rule, train the neural network model 1000 based on the tweaked gradient through the training determination module 50 if the score information is less than the pre-set threshold value, and input the obtained second feature value to the classification module 1200 included in the classification module 1200 if the score information is greater than or equal to the pre-set threshold value to obtain the output data on the input data. Because the various embodiments according to the disclosure, which is based on the control of the processor 120, has been described above with reference to FIGS. 1 to 7, redundant descriptions thereof may be omitted.

The communicator 130 including circuitry may communicate with the external device. The processor 120 may receive various data or information from the external device coupled through the communicator 130, and may transmit various data or information to the external device.

The communicator 130 may include at least one from among a Wi-Fi module, a Bluetooth module, a wireless communication module, and a near field communication (NFC) module. Each of the Wi-Fi module and the Bluetooth module may communicate through a Wi-Fi method and a Bluetooth method. When using the Wi-Fi module or the Bluetooth module, various connection information such as service set identifier (SSID) may first be transmitted and received, and may transmit and receive various information after communicatively coupling using the connection information.

In addition, the wireless communication module may perform communication according to various communication standards such as IEEE, Zigbee, 3rd generation (3G), 3rd generation partnership project (3GPP), long term evolution (LTE), 5th generation (5G), or the like. The NFC module may perform communication with a near field communication (NFC) method which uses a 13.56 MHz band from among the various radio frequency identification (RF-ID) frequency bands such as, for example, and without limitation, 135 kHz, 13.56 MHz, 433 MHZ, 860-960 MHz, 2.45 GHz, or the like.

According to the various embodiments of the disclosure, the processor 120 may, through the communicator 130, receive information on the pre-defined logic rule. For example, because the pre-defined logic rule may be varied according to the regulations or rules based on the country or region, the processor 120 may update the logic rule applied in the disclosure by receiving information on the pre-defined logic rule through the communicator 130. In addition, the processor 120 may receive information related to the neural network model 1000, the symbolic value mapping module 10, the merge module, the temporary answer acquisition module 30, the rule check module 40, the training determination module 50, and the like according to the disclosure through the communicator 130.

The outputter may include circuitry, and the processor 120 may output various functions which the electronic device 100 may perform through the outputter 160. The outputter 160 may include at least one from among a display, a speaker, and an indicator.

The display may output image data under the control of the processor 120. The display may output an image pre-stored in the memory 110 under the control of the processor 120. The display according to an embodiment of the disclosure may also display a user interface stored in the memory 110. The display may be implemented as a liquid crystal display (LCD) panel, an organic light emitting diodes (OLED), or the like. The display may also be implemented as a flexible display, a transparent display, or the like according to circumstance. However, the display according to the disclosure is not limited to a specific type.

The speaker may output audio data under the control of the processor 120, and the indicator may be lighted under the control of the processor 120.

According to the various embodiments of the disclosure, the processor 120 may provide the user with the output data obtained based on the disclosure through the outputter 160. The processor 120 may visually provide the user with output data through the display, and also provide the user with output data in the form of a speech signal through the speaker.

The inputter 150 may include circuitry, and the processor 120 may receive a user command for controlling an operation of the electronic device 100 through the inputter 150. The inputter 150 may include configurations such as a microphone, a camera (not shown), a remote control signal receiver (not shown), or the like. The inputter 150 may also be implemented in a form included in the display as a touch screen.

According to the various embodiments of the disclosure, the processor 120 may, through the inputter 150, receive the user command to start operation of the processor 120 according to the disclosure. The processor 120 may, through the inputter 150, regardless of whether or not training of the neural network model 1000 is sufficient, receive the user command to provide the output data corresponding to the input data through the current neural network model 1000.

The controlling method of the electronic device 100 according to an embodiment described above may be implemented as a program and provided to the electronic device 100. The program including the controlling method of the electronic device 100 may be stored and provided in a non-transitory computer readable medium.

In terms of a non-transitory computer readable recording medium including a program which executes the controlling method of the electronic device 100, the controlling method of the electronic device 100 may include obtaining, based on input data being input to the neural network model 1000, the first feature value corresponding to the input data through the feature extraction module 1100 included in the neural network model 1000, mapping, by inputting the obtained first feature value to the symbolic value mapping module 10 included in the electronic device, the information included in the first feature value to the symbolic value corresponding to each of the logically certain information and uncertain information, tweaking the gradient corresponding to the uncertain information through the symbolic value mapping module 10 so that update on the uncertain information may be possible, obtaining the second feature value in which the first feature value and the symbolic value are merged by inputting the first feature value and the symbolic value in the merge module included in the electronic device 100, obtaining the temporary answer information which includes the certain information and the uncertain information by inputting the first feature value and the symbolic value to the temporary answer acquisition module 30 included in the electronic device 100, obtaining the score information related to the level the temporary answer information matches the pre-defined logic rule by inputting the temporary answer information to the rule check module 40 included in the electronic device 100, and training, through the training determination module 50 included in the electronic device 100, the neural network model 1000 based on the tweaked gradient if the score information is less than the pre-set threshold value and obtaining the output data on the input data by inputting the second feature value obtained when the score information is greater than or equal to the pre-set threshold value to the classification module 1200 included in the neural network model 1000.

The non-transitory computer readable medium may refer to a medium that stores data semi-permanently rather than storing data for a very short time, such as a register, a cache, or a memory 110, and is readable by a device. The aforementioned various applications or programs may be stored in the non-transitory computer readable medium, such as, for example, and without limitation, a compact disc (CD), a digital versatile disc (DVD), a hard disc, a Blu-ray disc, a universal serial bus (USB), a memory card, a read only memory (ROM), and the like, and may be provided.

The controlling method of the electronic device 100, and the computer readable recording medium including the program which executes the controlling method of the electronic device 100 has been briefly described, but this is merely to omit redundant descriptions thereof, and the various embodiments with respect to the electronic device 100 may also be applied to the controlling method of the electronic device 100, and the computer readable recording medium including the program which executes the controlling method of the electronic device 100.

According to the various embodiments of the disclosure as described above, the usability and learning efficiency of the neural network model 1000 may be expanded by applying the logic rule while minimizing change with respect to the structure of the existing neural network models 1000, and the safety issue with respect to the neural network model 1000 may be solved by providing a logically reasonable result on exceptional circumstances which cannot be solved with only the statistical determination based on the learning data. In addition, according to the disclosure, by classifying statistical information and logically certain information, the unnecessary processing in the learning process of the neural network model 1000 may be minimized.

Because the existing neural network model 1000 addresses problems according to the learned pattern based on the learning data, like the problem associated with safety, there has been the limitation of it being difficult to solve the problem of having to forcibly apply logical rules regardless of the learning data. In addition, in order to train the existing neural network model 1000, quantities of learning data and long learning hours may be required, and there has been the problem of outputting an illogical result or even an unethical result going against social norms according to the distribution if the distribution of learning data is biased.

However, the neural network model 1000 may be trained to follow a specific logic rule regardless of the amount of learning data, the learning hours, and the distribution of learning data, and may solve exceptional cases which cannot be solved based on the learning data according to the logic rule. Because the neural network model 1000 according to the disclosure may learn differentiating the logically certain information and uncertain information, unnecessary processing may be minimized and efficiency and speed with respect to the process of training the neural network model 1000 may be improved.

In addition, the modules for implementing the controlling methods according to the disclosure may be implemented in the form of an embeddable software module or in the form of an independent neural network model 1000 in the existing neural network models 1000 by minimizing the structural change of the existing neural network model 1000, and accordingly the adding and changing of the logic rule for applying to the neural network model 1000 may also be easily carried out.

In addition to the above, by training the neural network model 1000 to match the learning data with respect to the unreasonable problem of not being able to apply the logic rule or solving the problem according to the logic rule, in addition to applying the logic rule to the neural network model 1000, the neural network model 1000 may be made to output a result with a high likelihood statistically.

The functions related to the neural network model as described above may be performed through the memory and the processor.

The processor may be comprised of a plurality of processors. The one or more processors may be a generic-purpose processor such as a CPU, an AP, or the like, a graphics dedicated processor such as a GPU, a video processing unit (VPU) or the like, or an artificial intelligence dedicated processor such as neural processing unit (NPU).

The one or more processors may control to process input data according to a pre-defined operating rule stored in a non-volatile memory and a volatile memory or an artificial intelligence model. The pre-defined operating rule or artificial intelligence model may be characterized by being made through learning.

Being made through learning refers to a pre-defined operating rule of a desired feature or artificial intelligence model being made by applying a learning algorithm to a plurality of learning data. The learning may be carried out through the machine itself in which artificial intelligence is performed according to an embodiment, or through a separate server/system.

The artificial intelligence model may be comprised of a plurality neural network layers. Each layer may have a plurality of weight values, and processing of the layer may be performed through a processing result of a previous layer and a processing of the plurality of weight values. Examples of a neural network may include, for example, a Convolutional Neural Network (CNN), a Deep Neural Network (DNN), a Recurrent Neural Network (RNN), a Restricted Boltzmann Machine (RBM), a Deep Belief Network (DBN), a Bidirectional Recurrent Deep Neural Network (BRDNN), a Generative Adversarial Networks (GAN), and a Deep Q-Networks, the neural network of the disclosure is not limited to the above-described examples, unless otherwise specified.

The learning algorithm may be a method which uses a plurality of learning data to train a predetermined subject machine (e.g., robot) to determine or predict on its own. Examples of the learning algorithm include a supervised learning, an unsupervised learning, a semi-supervised learning or a reinforcement learning, and the learning algorithm is not limited to the above-described examples, unless otherwise specified.

The machine-readable storage medium may be provided in the form of a non-transitory storage medium. Herein, "non-transitory" merely means that the storage medium is tangible and does not include a signal, and the term does not differentiate data being semi-permanently stored in the storage medium and data temporarily being stored. For example, the 'non-transitory storage medium' may include a buffer in which data is temporarily stored.

According to an embodiment of the disclosure, a method according to one or more embodiments may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™) or directly between two user devices (e.g., smartphones). In the case of online distribution, at least a portion of the computer program product (e.g., downloadable app) may be at least stored temporarily in a storage medium such as a server of a manufacturer, a server of an application store, or a memory of a relay server, or temporarily generated.

Each of the elements (e.g., a module or a program) according to various embodiments of the disclosure may be comprised of a single entity or a plurality of entities, and some sub-elements of the abovementioned sub-elements may be omitted, or different sub-elements may be further included in the various embodiments. Alternatively or additionally, some elements (e.g., modules or programs) may be integrated into one entity to perform the same or similar functions performed by each respective element prior to integration.

Operations performed by a module, program, or other element, in accordance with various embodiments, may be performed sequentially, in a parallel, repetitive, or heuristically manner, or at least some operations may be performed in a different order, omitted or a different operation may be added.

The terms "part" or "module" used in the disclosure may include a unit configured as a hardware, software, or firmware, and may be used interchangeably with terms such as, for example, and without limitation, logic, logic blocks, parts, circuits, or the like. "Part" or "module" may be a component integrally formed or a minimum unit or a part of the component performing one or more functions. For example, a module may be configured as an application-specific integrated circuit (ASIC).

One or more embodiments of the disclosure may be implemented with software including instructions stored in a machine-readable storage media (e.g., computer). The machine may call an instruction stored in the storage medium, and as a device capable of operating according to the called instruction, may include an electronic device (e.g., electronic device 100) according to embodiments.

Based on the instruction being executed by the processor, the processor may directly or under the control of the processor perform a function corresponding to the instruction using different elements. The instructions may include a code generated by a compiler or executed by an interpreter.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device configured to apply a logical constraint to a neural network model for determining an operation of an autonomous driving automobile, the electronic device comprising:
   memory configured to store one or more computer programs, a neural network model, a symbolic value mapping module, a merge module, a temporary answer acquisition module, a rule check module, and a training determination module; and
   one or more processors communicatively coupled to the memory,
   wherein the one or more computer programs include computer-executable instructions that, when executed by the one or more processors individually or collectively, cause the electronic device to:
   receive, by the electronic device, input data being input for the neural network model,
   obtain, by the electronic device, based on the input data, a first feature value corresponding to the input data through a feature extraction module comprised in the neural network model,
   input, by the electronic device, the first feature value to the symbolic value mapping module,
   map, by the electronic device, information comprised in the first feature value to a symbolic value identifying the first feature value as one of logically true information, logically false information or uncertain information related to an action which may be taken when there is a high likelihood of a traffic accident occurring,
   tweak, by the electronic device, a gradient corresponding to the uncertain information through the symbolic value mapping module to trigger an update on the uncertain information,
   obtain, by the electronic device, a second feature value in which the first feature value and the symbolic value are merged by inputting the first feature value and the symbolic value to the merge module,
   obtain, by the electronic device, temporary answer information by inputting the first feature value and the symbolic value to the temporary answer acquisition module,
   obtain, by the electronic device, a score information related to a level the temporary answer information matches a pre-defined logic rule by inputting the temporary answer information to the rule check module,
   based on the score information being less than a pre-set threshold value, train, by the electronic device, through the training determination module, the neural network model based on the tweaked gradient until the score information is greater than or equal to the pre-set threshold value, update the second feature value through the trained neural network model, and obtain output data based on the input data by inputting the updated second feature value into a classification module comprised in the neural network model, and based on the score information being greater than or equal to the pre-set threshold value, obtain, by the electronic device, the output data based on the input data by inputting the obtained second feature value into the classification module, wherein the output data is for controlling the electronic device or an external device to perform an operation matching the pre-defined logic rule, and wherein the classification module identifies a category corresponding to the input data from among a plurality of categories based on the second feature value which is output by the feature extraction module.

2. The electronic device of claim 1, wherein the one or more computer programs further include computer-executable instructions that, when executed by the one or more processors individually or collectively, cause the electronic device to:

train the neural network model for the uncertain information to be updated based on the tweaked gradient, and obtain, based on the uncertain information being updated and the score information being greater than or equal to a pre-set threshold value, the output data by inputting the second feature value updated through the trained neural network model to the classification module.

3. The electronic device of claim 1, wherein the one or more computer programs further include computer-executable instructions that, when executed by the one or more processors individually or collectively, cause the electronic device to:

tweak, through the symbolic value mapping module, a gradient corresponding to the uncertain information to a value other than 0 to trigger the update on the uncertain information, and maintain a gradient corresponding to the logically true information or the logically false information to 0 for an update on the logically true information or the logically false information to not be carried out.

4. The electronic device of claim 1, wherein the symbolic value mapping module comprises:

a condition symbolic value mapping module configured to map the first feature value to a condition symbolic value corresponding to a pre-defined condition, and an action symbolic value mapping module configured to map the first feature value to an action symbolic value corresponding to a pre-defined action, and wherein the one or more computer programs further include computer-executable instructions that, when executed by the one or more processors individually or collectively, cause the electronic device to:

map, through the condition symbolic value mapping module, information comprised in the first feature value to a different condition symbolic value with respect to each of the logically true information, the logically false information, and the uncertain information related to the pre-defined condition, and map, through the action symbolic value mapping module, information comprised in the first feature value to a different action symbolic value with respect to each of the logically true information, the logically false information, and the uncertain information related to the pre-defined action.

5. The electronic device of claim 4, wherein the one or more computer programs further include computer-executable instructions that, when executed by the one or more processors individually or collectively, cause the electronic device to:

input the first feature value, the condition symbolic value, and the action symbolic value to the temporary answer acquisition module, and obtain a temporary answer information comprising information on a condition comprised in the first feature value and information on an action corresponding to information on a condition comprised in the first feature value.

6. A controlling method of an electronic device configured to apply a logical constraint to a neural network model executed by one or more processors in the electronic device for determining an operation of an autonomous driving automobile, the method comprising:

receiving, by the electronic device, input data being input for the neural network model, obtaining, by the electronic device, a first feature value corresponding to the input data through a feature extraction module comprised in the neural network model;

inputting, by the electronic device, the first feature value to a symbolic value mapping module executed by the one or more processors in the electronic device, mapping, by the electronic device, information comprised in the first feature value to a symbolic value identifying the first feature value as one of logically true information, logically false information or uncertain information related to an action which may be taken when there is a high likelihood of a traffic accident occurring;

tweaking, by the electronic device, a gradient corresponding to the uncertain information through the symbolic value mapping module to trigger an update on the uncertain information;

obtaining, by the electronic device, a second feature value in which the first feature value and the symbolic value are merged by inputting the first feature value and the symbolic value to a merge module comprised in the electronic device;

obtaining, by the electronic device, temporary answer information by inputting the first feature value and the symbolic value to a temporary answer acquisition module comprised in the electronic device;

obtaining, by the electronic device, a score information related to a level the temporary answer information matches a pre-defined logic rule by inputting the temporary answer information to a rule check module comprised in the electronic device;

based on the score information being less than a pre-set threshold value, training, through a training determination module, the neural network model based on the tweaked gradient until the score information is greater than or equal to the pre-set threshold value, updating the second feature value through the trained neural network model, and obtaining output data based on the input data by inputting the updated second feature value into a classification module comprised in the neural network model; and based on the score information being greater than or equal to the pre-set threshold value, obtaining the output data on the input data by inputting the obtained second feature value into the classification module;

wherein the output data is for controlling the electronic device or an external device to perform an operation matching the pre-defined logic rule, and wherein the classification module identifies a category corresponding to the input data from among a plurality of categories based on the second feature value which is output by the feature extraction module.

7. The method of claim 6, further comprising:
training the neural network model for the uncertain information to be updated based on the tweaked gradient; and
obtaining, based on the uncertain information being updated and the score information being greater than or equal to a pre-set threshold value, the output data by inputting the second feature value updated through the trained neural network model to the classification module.

8. The method of claim 6, wherein the tweaking the gradient comprises:
tweaking, through the symbolic value mapping module, a gradient corresponding to the uncertain information to a value other than 0 to trigger the update on the uncertain information, and
maintaining a gradient corresponding to the logically true information or the logically false information to 0 for an update on the logically true information or the logically false information to not be carried out.

9. The method of claim 6,
wherein the symbolic value mapping module comprises:
a condition symbolic value mapping module configured to map the first feature value to a condition symbolic value corresponding to a pre-defined condition, and
an action symbolic value mapping module configured to map the first feature value to an action symbolic value corresponding to a pre-defined action, and
wherein the mapping of the symbolic value comprises:
mapping, through the condition symbolic value mapping module, information comprised in the first feature value to a different condition symbolic value with respect to each of the logically true information, the logically false information, and the uncertain information related to the pre-defined condition, and
mapping, through the action symbolic value mapping module, information comprised in the first feature value to a different action symbolic value with respect to each of the logically true information, the logically false information, and the uncertain information related to the pre-defined action.

10. The method of claim 9, wherein the obtaining of the temporary answer information comprises:
inputting the first feature value, the condition symbolic value, and the action symbolic value to the temporary answer acquisition module, and
obtaining temporary answer information comprising information on a condition comprised in the first feature value and information on an action corresponding to information on a condition comprised in the first feature value.

11. One or more non-transitory computer-readable storage media storing one or more computer programs including computer-executable instructions that, when executed by one or more processors of an electronic device individually or collectively, cause the electronic device to perform operations, the operations comprising:
receiving, by the electronic device, input data being input for a neural network model for determining an operation of an autonomous driving automobile,
obtaining, by the electronic device, a first feature value corresponding to the input data through a feature extraction module comprised in the neural network model;
inputting, by the electronic device, the first feature value to a symbolic value mapping module comprised in the electronic device,
mapping, by the electronic device, information comprised in the first feature value to a symbolic value identifying the first feature value as one of logically true information, logically false information or uncertain information related to an action which may be taken when there is a high likelihood of a traffic accident occurring;
tweaking, by the electronic device, a gradient corresponding to the uncertain information through the symbolic value mapping module to trigger an update on the uncertain information;
obtaining, by the electronic device, a second feature value in which the first feature value and the symbolic value are merged by inputting the first feature value and the symbolic value to a merge module comprised in the electronic device;
obtaining, by the electronic device, temporary answer information by inputting the first feature value and the symbolic value to a temporary answer acquisition module comprised in the electronic device;
obtaining, by the electronic device, score information related to a level the temporary answer information matches a pre-defined logic rule by inputting the temporary answer information to a rule check module comprised in the electronic device; and
based on the score information being less than a pre-set threshold value, training, by the electronic device, through a training determination module executed by the one or more processors in the electronic device, the neural network model based on the tweaked gradient until the score information is greater than or equal to the pre-set threshold value, update the second feature value through the trained neural network model, and obtaining output data based on the input data by inputting the updated second feature value into a classification module comprised in the neural network model, and
based on the score information being greater than or equal to the pre-set threshold value, obtaining, by the electronic device, the output data based on the input data by training by inputting the obtained second feature value into the classification module,
wherein the output data is for controlling the electronic device or an external device to perform an operation matching the pre-defined logic rule, and
wherein the classification module identifies a category corresponding to the input data from among a plurality of categories based on the second feature value which is output by the feature extraction module.

12. The one or more non-transitory computer-readable storage media of claim 11, wherein the symbolic value mapping module comprises:
a feature conversion module configured to map the information included in the first feature value to the symbolic value, and
a gradient tweaking module configured to tweak the gradient corresponding to logically uncertain information from among the information included in the first feature value.

13. The one or more non-transitory computer-readable storage media of claim 11, wherein the training determination module is configured to determine training of the neural network model based on first score information related to a level matching the pre-defined logic rule and second score information related to a level the output data matches a learning data of the neural network model.

14. The one or more non-transitory computer-readable storage media of claim 13, wherein the training determination module is configured to determine the training of the neural network model based on comprehensive score information that is a sum of the first score information and the second score information.

15. The one or more non-transitory computer-readable storage media of claim 13, wherein the training determination module is configured to determine the training of the neural network model based on comprehensive score information that is a product of the first score information and the second score information.

* * * * *